United States Patent
Fattouche

(10) Patent No.: US 11,453,236 B2
(45) Date of Patent: *Sep. 27, 2022

(54) SNAP-ON AUTOMOTIVE WHEEL COVER OVERLAY WITH EXTENDED SURROUND AND METHOD FOR MANUFACTURING THE SAME

(71) Applicant: Naje Fattouche, Bowie, MD (US)

(72) Inventor: Naje Fattouche, Bowie, MD (US)

(73) Assignee: Neo Design, LLC, Bowie, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,939

(22) Filed: Dec. 23, 2021

(65) Prior Publication Data

US 2022/0250410 A1    Aug. 11, 2022

Related U.S. Application Data

(60) Division of application No. 17/351,857, filed on Jun. 18, 2021, now Pat. No. 11,254,160, and a division of application No. 17/206,893, filed on Mar. 19, 2021, now abandoned, and a continuation-in-part of application No. 17/153,558, filed on Jan. 20, 2021, now abandoned.

(51) Int. Cl.
  *B60B 7/06*  (2006.01)
  *B60B 7/08*  (2006.01)
  *B60B 7/00*  (2006.01)

(52) U.S. Cl.
  CPC .............. *B60B 7/066* (2013.01); *B60B 7/008* (2013.01); *B60B 7/0046* (2013.01); *B60B 7/08* (2013.01); *B60B 2900/572* (2013.01)

(58) Field of Classification Search
  CPC ......... B60B 7/066; B60B 7/08; B60B 7/0046; B60B 2900/572; B60B 7/008
  See application file for complete search history.

(56) References Cited

U.S. PATENT DOCUMENTS

| | | |
|---|---|---|
| 6,517,168 B1 | 2/2003 | Van Houten |
| 6,637,832 B2 | 10/2003 | Wrase et al. |
| 7,314,255 B2 | 1/2008 | Wang |
| 7,416,260 B1 | 8/2008 | Cuevas |
| 7,510,248 B2 | 3/2009 | Wang |
| 8,052,223 B2 | 11/2011 | McCorry et al. |

(Continued)

*Primary Examiner* — Kip T Kotter
(74) *Attorney, Agent, or Firm* — Law Offices of Chauncey B. Johnson; Chauncey B. Johnson, Esq

(57) ABSTRACT

An improved snap-on automotive wheel cover overlay with extended surround having hook-shaped members for the purpose of securing the wheel cover overlay of the present invention to a damaged manufacturer's wheel cover. The wheel cover overlay of the present invention is further secured by inserting a tension rotation device from the reversed position of a tire into a manufactured in wheel cover overlay tension tabs assembly, and having an extended surround covering the entire rim of a vehicle when installed there on. During manufacturing of the present invention, a three dimensional (3D) scanned imaging of the individual embodiment component parts is generated, after rigorous testing, and is transferred to an injection molding computer to generate the injection molding designed precisely corresponding to each individual component parts of the present invention.

9 Claims, 34 Drawing Sheets

(56) References Cited

U.S. PATENT DOCUMENTS

| | | |
|---|---|---|
| 8,382,211 B2 | 2/2013 | Renius et al. |
| 8,814,277 B2 | 8/2014 | Ichinose et al. |
| 9,227,463 B2 | 1/2016 | Hsieh |
| 9,517,656 B2 | 12/2016 | Von Roenne |
| 9,821,599 B2 | 11/2017 | Wang |
| 11,254,160 B2 * | 2/2022 | Fattouche ............ B60B 7/0046 |
| 2007/0096543 A1 | 5/2007 | Hsieh |
| 2007/0096546 A1 | 5/2007 | Thomas et al. |
| 2011/0148181 A1 | 6/2011 | Silva de Carvalho et al. |
| 2013/0278043 A1 | 10/2013 | Wang |
| 2016/0368315 A1 | 12/2016 | Nunes |
| 2018/0072094 A1 | 3/2018 | Hsish |
| 2019/0030948 A1 | 1/2019 | Wang |
| 2019/0319907 A1 | 10/2019 | Nunes et al. |

* cited by examiner

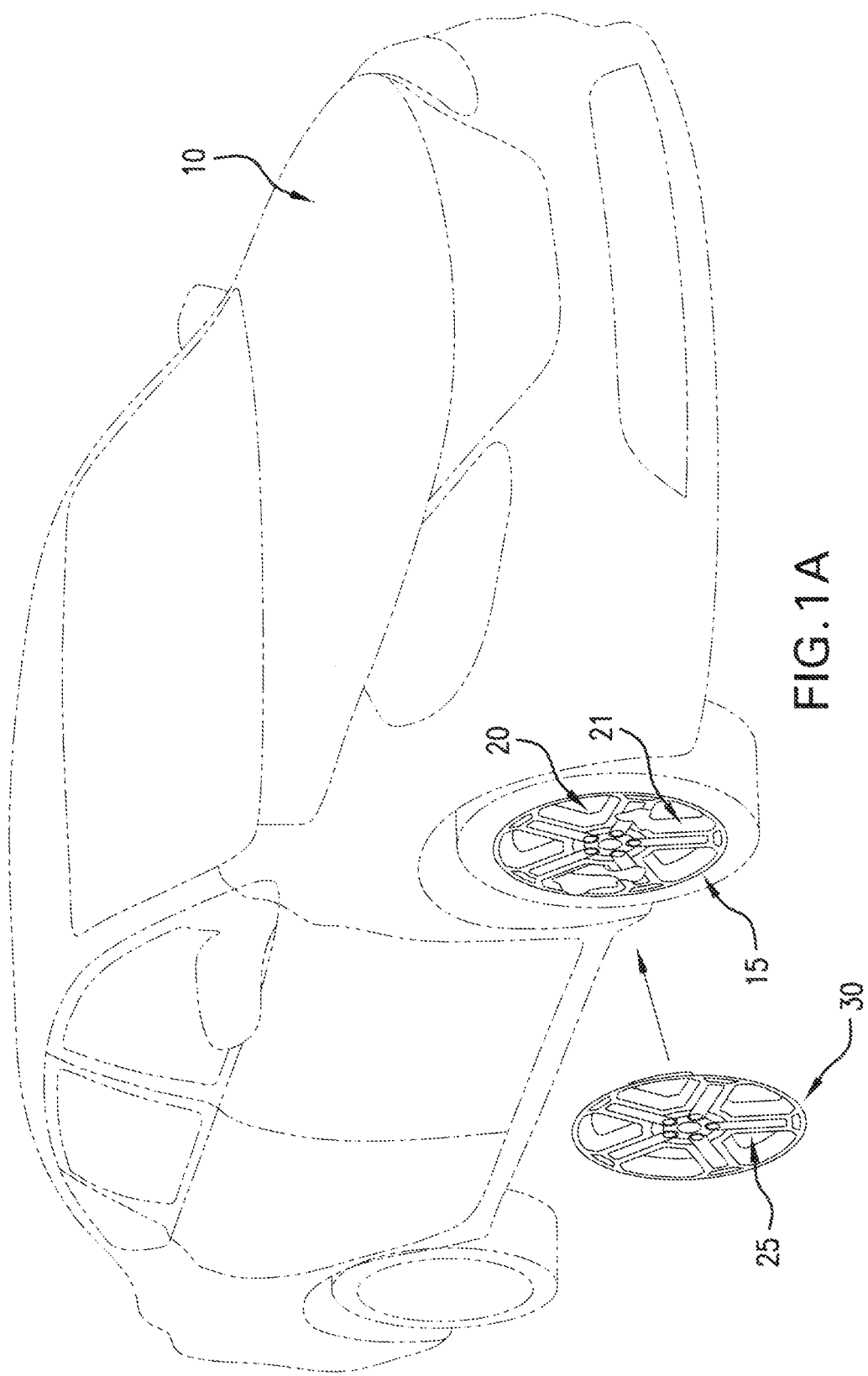

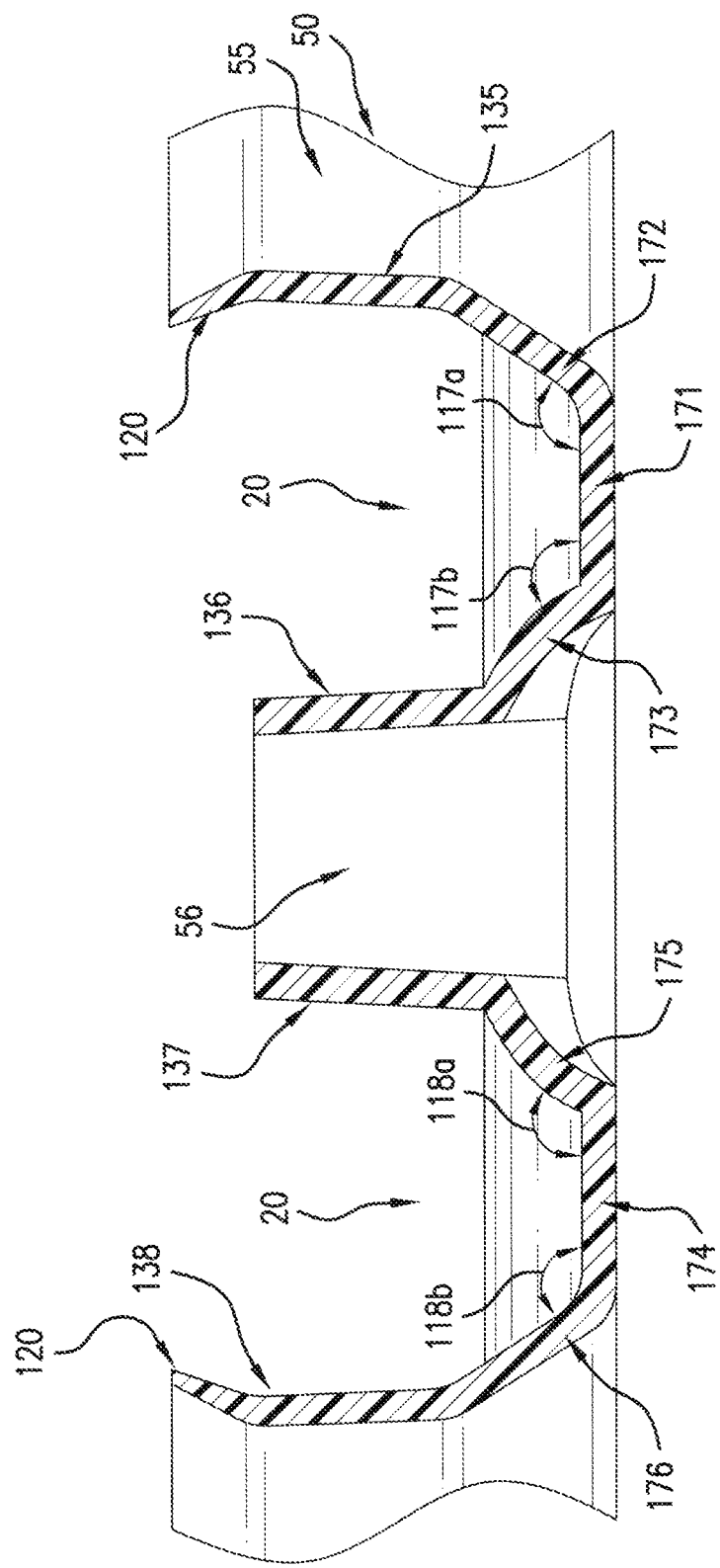

SNAP-ON AUTOMOTIVE WHEEL COVER OVERLAY WITH EXTENDED SURROUND AND METHOD FOR MANUFACTURING THE SAME

This is Divisional Application which benefits and claims priority from previously filed Divisional application Ser. No. 17/351,857, Continuation in Part application Ser. No. 17/153,558 and Divisional application Ser. No. 17/206,893.

TECHNICAL FIELD

The presently disclosed subject matter generally pertains to an improved automotive wheel cover overlay with extended surround, and more specifically to an automotive wheel cover overlay with extended surround capable of snapping over an identical, previously installed wheel cover of an automobile. The purpose of the formerly described automobile wheel cover overlay with extended surround is to cover up the latterly described manufacturer's or aftermarket's automobile wheel cover which was damaged, for example, during an automobile collision, or in the absence of an automobile collision but in the presence of other non-collision damage, to provide a snap-on automobile wheel cover overlay with extended surround of the present invention with an enhanced cosmetic finish and an attractive appearance.

BACKGROUND

In general, aftermarket components are used to enhance automobile cosmetic appearances which can be added to an automobile to add decoration and customization to a vehicle beyond what is supplied by the vehicle manufacturer. One component is an automobile wheel cover overlay which fits over the manufacturer's or aftermarket's installed automobile wheel cover and provides a customized look. An aftermarket automobile wheel cover overlay is typically custom manufactured to precisely fit over a specific one or more wheel cover of a specific vehicle or vehicles. Commonly, aftermarket automobile wheel cover overlays are finished in a chrome or black finish, thus providing a new look to the automobile installed thereon.

Aftermarket automobile wheel cover overlays are comprised of different shapes and designs and are used to fit over automobile factory wheel covers when said wheel covers are damaged, for example, in an automobile collision or when said wheel covers demonstrate severe wear and tear and are unattractive due to being exposed to the environmental elements for a significant amount of time. When installed, the wheel cover overlays cover the damaged wheel covers and provide the automobiles with new cosmetic and new decorative finishes which enhance said automobiles' appearances and increase their resale value.

Most automobile wheel covers which are known in the prior art are typically designed to replace a damaged manufacturer's or aftermarket's wheel covers. Replacing a manufacturer's or aftermarket's wheel cover requires expending significant resources on labor needed to first remove a manufacturer's or aftermarket's wheel cover, and second to replace a manufacturer's or aftermarket's wheel cover with the replacement aftermarket wheel cover. Next the replacement wheel cover is painted, which blends the wheel cover with the appearance of the rest of the vehicle.

Prior to this invention, most prior art taught automobile wheel covers were used to outright replace manufacturer's or aftermarket's wheel covers when damaged, for example, during a automobile collision, or when damaged, for example, during long exposure to the environmental elements. In addition, these prior art replacement wheel covers and wheel cover overlays used clips, integral legs, snap tabs, protruding strips and adhesive that failed and that led to the wheel covers and the replacement wheel cover overlays frequently separating from rims of the cars or frequently separating from existing, damaged wheel covers respectively.

First, the prior art Van Houten in U.S. Pat. No. 6,517,168 teaches a wheel cover assembly with pocket inserts fastened to the wheel cover using an integral snap tab arrangement including integral snap tabs that extend in an inboard direction from the inboard surface of the wheel cover and that are disposed around each turbine pocket. Second, the prior art Wang in U. S. Pat. Application No. 2007/0096545 teaches a wheel rim covering structure with costal bodies and engraved holes with shrinking hole edge equipped with a plastic made fastener assembly having a suitable length stem. Third, the prior art Wang in U.S. Pat. No. 7,510,248 teaches a wheel rim cover mounting structure having a plurality of equiangularly spaced through holes, a plurality of protruding flanges perpendicularly protruded from the back side of the cover body around the border of each of the through holes and a plurality of plugholes respectively provided at two sides of each of the protruding flanges, etc. Fourth, the prior art Wang in U. S. Pat. Application 2013/0278043 teaches an automobile wheel rim cover having a plurality of mounting holes, a plurality of through holes cut through opposing front and back walls of a cover body thereof corresponding to the mounting holes of the steel wheel, a plurality of upright flanges protruding from the back wall of the cover body around the through holes, a plurality of beveled retaining devices protruding from an outer wall of each upright flange and insertable with the respective upright flanges through the mounting holes of the steel wheel for hooking on a back wall of the rim of the steel wheel. Fifth, the prior art Hsieh in U.S. Pat. No. 9,227,463 teaches an adjustable wheel cover for aluminum alloy rim wherein a peripheral wall is extended axially from an inner surface of the wheel cover and along a periphery of each through hole with an assembly part disposed with a plurality of adjustment holes radially and a locking block on a spring of the fixing part secured in the adjustment hole correspondingly.

The present invention has a unique geometric shape which differs from clips, integral legs, snap tabs, protruding strips and adhesive and prevents vibration from separating the wheel cover overlay of the present invention from a vehicle's original wheel cover after being snapped on. No prior art wheel cover or wheel cover overlay to date has fastening and retaining devices using the geometric shape and material composition similar or identical to the snap-on wheel cover technology employed by the present invention. Thus, that because the fastening and retaining devices mounted on the prior art automotive wheel covers and after market wheel covers overlays do not have the requisite geometric shape and overall strength, they require the application of secondary components for affixing an original manufacturer's or aftermarket's automotive wheel cover (i.e. tape, glue, clips, etc.). This makes installation somewhat tedious, inconvenient, expansive, and perhaps even messy. Furthermore, these prior art automotive wheel covers and aftermarket wheel cover overlays are prone to loosen over time with repeated use of the automobile, and requiring numerous, labor intensive and costly repairs over the life span of the automobile.

GENERAL DESCRIPTION

A primary objective of the present invention is to provide an automotive wheel cover overlay with extended surround that has the identical configuration of a damaged manufacturer's or aftermarket's automotive wheel cover, and has the capability of being securely snapped on into place over the latter, and provides the appearance of a new or enhance manufacturer's or after market's automotive wheel cover without the need of first removing the damaged automotive wheel cover.

Another objective of the present invention is to provide an automotive wheel cover overlay with extended surround capable of being snapped over an existing manufacturer's or aftermarket's automotive wheel cover, without requiring the use of double-sided tape or other bonding materials, such clips to hold the automotive wheel cover overlay in place.

Another objective of the present invention is to provide an automotive wheel cover overlay with extended surround constructed of rigid material capable of being flexed and optionally constructed of a single piece of polymer material rather than a hybrid polymer material capable of affixing over an existing manufacturer's or aftermarket's wheel cover without any additional components.

Still another objective of the present invention is to provide an improved automotive wheel cover overlay with extended surround capable of being snapped over a manufacturer's or aftermarket's wheel cover to cover up damage or wear and tear of the latter without being noticeable to consumers that said improved automotive wheel cover overlay had been installed.

Yet another objective of the present invention is to provide an improved automotive wheel cover overlay with extended surround capable of being snapped over a manufacturer's or aftermarket's wheel cover to cover up damage or wear and tear of the latter without requiring numerous, labor intensive and costly repairs over the life span of a vehicle.

In accordance with certain aspects of the presently disclosed subject matter, there is provided an improved automotive wheel cover overlay with extended surround capable of being snapped over a manufacturer's existing wheel cover to cover up damage or wear and tear of the latter, said automotive wheel cover overlay with extended surround of the present invention comprising fastening or retaining devices with a unique geometric shape and unique angles used for snapping over corresponding regions of a manufacturer's or aftermarket's existing wheel cover in need of repair or appearance enhancement.

In accordance with further aspects and, optionally, in combination with other aspects of the presently disclosed subject matter, the fastening or retaining devices of the present invention's automotive wheel cover overlay containing the snap-on technology used for snapping over corresponding regions of a manufacturer's existing wheel cover or an existing aftermarket cover is are comprised of a hook-shaped member comprising of rigid polymer extending from an upper end of a flange, wherein said flange is radially protruding from the inboard surface area of the wheel cover overlay with extended surround of the present invention, and protruding continuously along a polymer longitudinal portion and a polymer upper arm edge which form a geometric orientation on one side that permits the flanges of the wheel cover overlay with extended surround of the present invention when inserted into through holes bearing the corresponding shapes of said flanges to firmly attached to the rear surface of a manufacturer's or aftermarket's wheel cover when snapped into place. Similarly, and on an opposite side, said flange is radially protruding from the inboard surface area side of the wheel cover overlay with extended surround of the present invention, and protruding continuously along a polymer longitudinal portion and a polymer upper arm edge which form a geometric orientation on an opposite side that permits the flanges of the wheel cover overlay with extended surround of the present invention when inserted into through holes bearing the corresponding shapes of said flanges to firmly attach to the rear surface of a manufacturer's or aftermarket's wheel cover when snapped into place.

In accordance with further aspects and, optionally, in combination with other aspects of the presently disclosed subject matter, the fastening or retaining devices of the present invention's automotive wheel cover overlay with extended surround containing the snap-on technology used for snapping over corresponding regions of a manufacturer's existing wheel cover or an aftermarket's existing wheel cover are comprised on one side of at least one rigid polymer hook-shaped member that protrudes from either the flanges or the lug nut towers and defines an interior region which grippingly engages a portion behind protruding walls of corresponding mounting slots of an existing manufacturer's or aftermarket's wheel cover, and on an opposite side at least one rigid polymer hook-shaped member that protrude from either the flanges or the lug nut towers, and defines an interior region which grippingly engages a portion behind protruding walls of corresponding mounting slots of an existing manufacturer's or aftermarket's wheel cover.

Still, in accordance with further aspects and, optionally, in combination with other aspects of the presently disclosed subject matter, the fastening or retaining devices of the present invention's automotive wheel cover overlay containing the snap-on technology is are used for snapping over corresponding regions of an existing manufacturer's or aftermarket wheel cover, wherein upon engagement of said rigid polymer hook-shaped member that protrude from either the flanges or the lug nut towers of the present invention's automotive wheel cover overlay with extended surround with the corresponding portions of a manufacturer's or aftermarket's wheel cover, the present invention's automotive wheel cover overlay with extended surround is firmly affixed to said manufacturer's or aftermarket's wheel cover.

Still, in accordance with further aspects and, optionally, in combination with other aspects of the presently disclosed subject matter, an interior surface of said automotive wheel cover overlay's fastening and retaining devices of the present invention is contoured to precisely conform to the inboard surface area behind the protruding walls of corresponding slots of an existing manufacturers or aftermarket's wheel cover, such that upon engagement of the rigid polymer hook-shaped members that protrude from either the flanges or the lug nut towers with the rear or back side walls of said manufacturer's or aftermarket's automotive wheel cover overlay, said automotive wheel cover overlay with extended surround of the present invention is intended to be flush against the rear surface of the manufacturer's or the aftermarket wheel cover.

Still, in accordance with further aspects and, optionally, in combination with other aspects of the presently disclosed subject matter, the fastening or retaining devices mounted on the flanges or the lug nut towers of the automotive wheel cover overlay of the present invention may be composed of a rigid polymer material that can be temporarily flexed during installation of said automotive wheel cover overlay over an existing manufacturer's or aftermarket wheel cover.

Yet, in accordance with further aspects and, optionally, in combination with other aspects of the presently disclosed subject matter, the fastening or retaining devices mounted on the flanges or the lug nut towers of the automotive wheel cover overlay of the present invention are manufactured from a rigid material that allows for manipulation of the fastening or retaining devices during installation over an existing manufacturer's or aftermarket's wheel cover to facilitate engagement of the major and the minor rigid polymer hook-shaped members snap-on technology of the present invention with corresponding inboard surface portion and rear lower surface portion of the protruding walls of the corresponding mounting slots of an existing manufacturer's or aftermarket's wheel cover respectively.

Still yet, in accordance with further aspects and, optionally, in combination with other aspects of the presently disclosed subject matter, when snapped in placed over an existing damaged manufacturer's wheel cover, the wheel cover overlay with extended surround of the present invention, in addition to the presence of hook-shaped members for the purpose of securing the former to the latter, is further secured by inserting a tension rotation device from the reversed position of a tire into a manufactured in wheel cover overlay tension tabs assembly, such that tension rotation device prongs of a tension rotation device penetrate through a tension rotation device prong's corresponding openings. Said tension tab rotation device is secured in said tension tabs assembly by the use of a tension rotation device fastener, after which an automobile emblem support device with tension tabs corresponding to a tension tab guide plate slits is inserted to further secure the wheel cover overlay with extended surround of the present invention to an existing damaged manufacturer's wheel cover.

Yet still, in accordance with further aspects and, optionally, in combination with other aspects of the presently disclosed subject matter, the front surface of the automotive wheel cover overlay of the present invention is finished in a decorative finish.

Among advantages of certain embodiments of the presently disclosed subject matter is are that the improved automotive wheel cover overlay of the present invention can be snapped on to an existing manufacturer's or aftermarket's existing wheel cover and held firmly in place by means of hook-shaped members of the fastening or retaining devices, such as a tension rotation device, etc. of the automotive wheel cover overlay with extended surround of the present invention without requiring the use of double sided tape or clips to hold the automotive wheel overlay in place.

BRIEF DESCRIPTION OF THE DRAWINGS

In order to understand the invention and to see how it can be carried out in practice, embodiments will be described, by the way of non-limiting examples, with references to accompanying drawings, in which:

FIG. 1A illustrates a front perspective view of the wheel cover overlay with extended surround of the present invention prior to snap on installation over an existing vehicle's wheel cover.

FIG. 5B illustrates a section diagram of FIG. 5A of the wheel cover overlay with extend surround of the present invention.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1B:
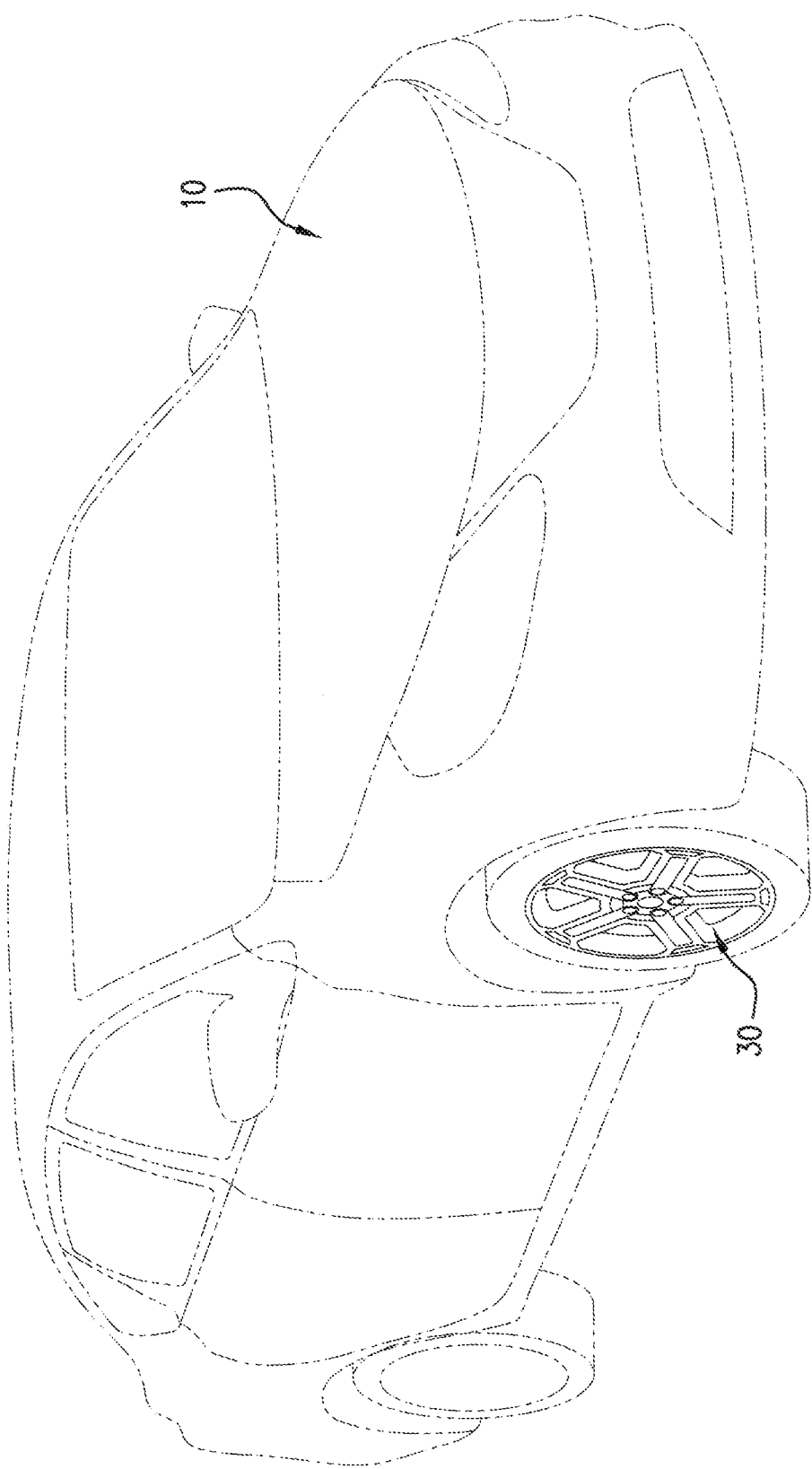
FIG. 1B illustrates a front perspective view of the wheel cover overlay with extended surround of the present invention after snap on installation over an existing vehicle's wheel cover.

Bearing in mind, attention is drawn to FIGS. 1A and 1B illustrating the wheel cover overlay with extended surround of the present invention prior to installation and after installation respectively. Said wheel cover overlay with extended surround is used for covering over a damaged manufacturer's or aftermarket's wheel cover resulting from a vehicle's accident or resulting from environmental wear and tear and without requiring numerous, labor intensive and costly repairs over the life span of the vehicle.

As shown in FIG. 1A, an automobile 10 with a damaged manufacturer's or aftermarket's wheel cover 15 comprises a plurality of mounting slots 20 corresponding to a plurality of through holes 25 of a pre-installed wheel cover overlay 30 of the present invention. As shown in FIG. 1B, an automobile 10 with a damaged wheel cover as described in FIG. 1A is fitted with a wheel cover overlay with extended surround 30 of the present invention. Therefore, as shown in FIG. 1B, a wheel cover overlay with extended surround 30 of the present invention with identical configuration of a damaged manufacturer's or aftermarket's wheel cover is securely snapped on into place over the latter, thereby providing the appearance of a new or enhanced manufacturer's or aftermarket's wheel cover, without the need of removing said damaged manufacturer's or aftermarket's wheel cover 15.

Figure 2:
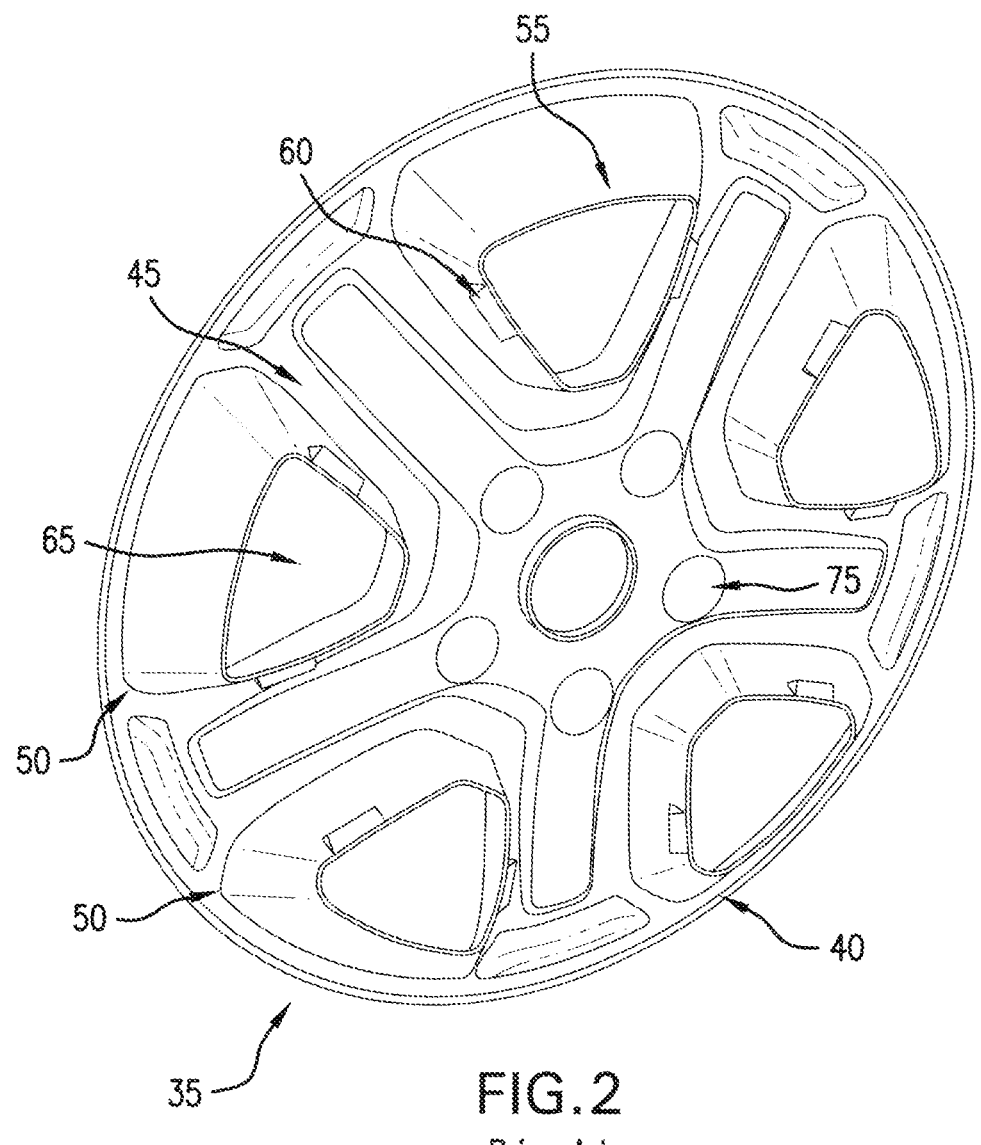
FIG. 2 illustrates an inboard surface area elevated perspective view of an existing vehicle's wheel cover of the prior art.

An inboard surface area of a prior art depicting a wheel cover 35 is illustrated in FIG. 2. Said prior art wheel cover comprises an outer peripheral boundary surface 40, an inward board surface area 45, equally spaced flanges 50 protruding or projecting from the inward board surface area of the rear surface of the wheel cover, and said flanges are formed by lateral walls 55 used for configuring the shapes of said flanges, through holes or cut openings 65 designed to correspond to the mounting slots of a damaged existing wheel cover and snap tabs 60 for snapping on the prior art wheel cover over said damaged existing automotive wheel cover. In addition to snap tabs, the prior art also teaches using clips, and integral legs terminating with a foot, etc. Finally, the prior art of FIG. 2 teaches a plurality of holes 75 carved into the inboard of the surface area of the wheel cover corresponding to designs of wheel nuts, which are used for firmly attaching a vehicle's rim housing and a vehicle's tire to a vehicle.

Figure 3:
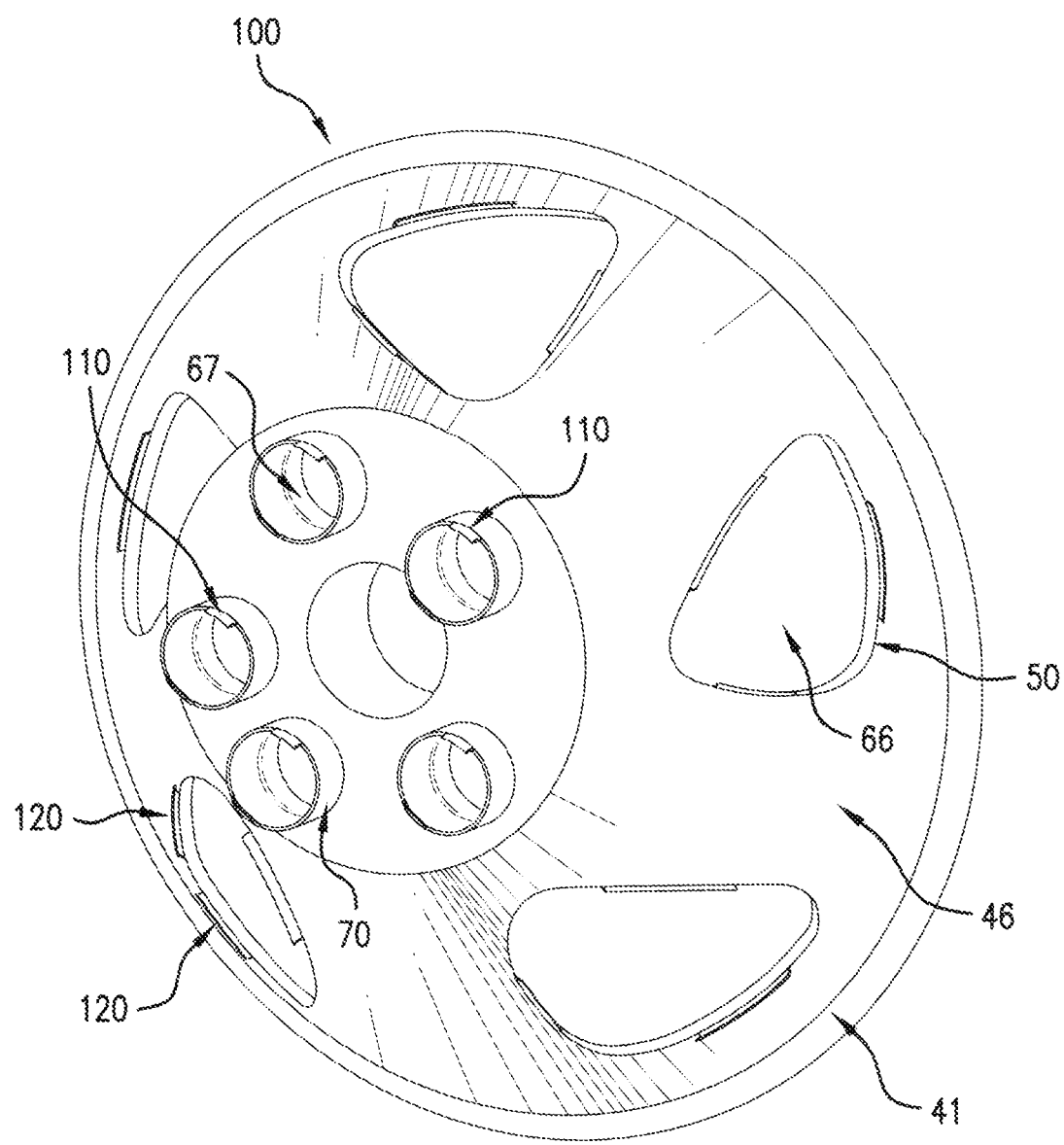
FIG. 3 illustrates an inboard surface area elevated perspective view of the wheel cover overlay with extended surround of the present invention.

Referring to an embodiment of this present invention, FIG. 3 illustrates a wheel cover overlay 100 comprising an outer peripheral boundary surface 41, an inboard surface area 46, a plurality of lug nut towers 70, said plurality of lug nut towers comprising through holes 67, a plurality of flanges 50 containing a plurality of through holes 66, a plurality of major snap on hook-shaped members 120 protruding from said flanges, and a plurality of minor snap on hook-shaped members 110 protruding from said lug nut towers 70.

Figure 4A:
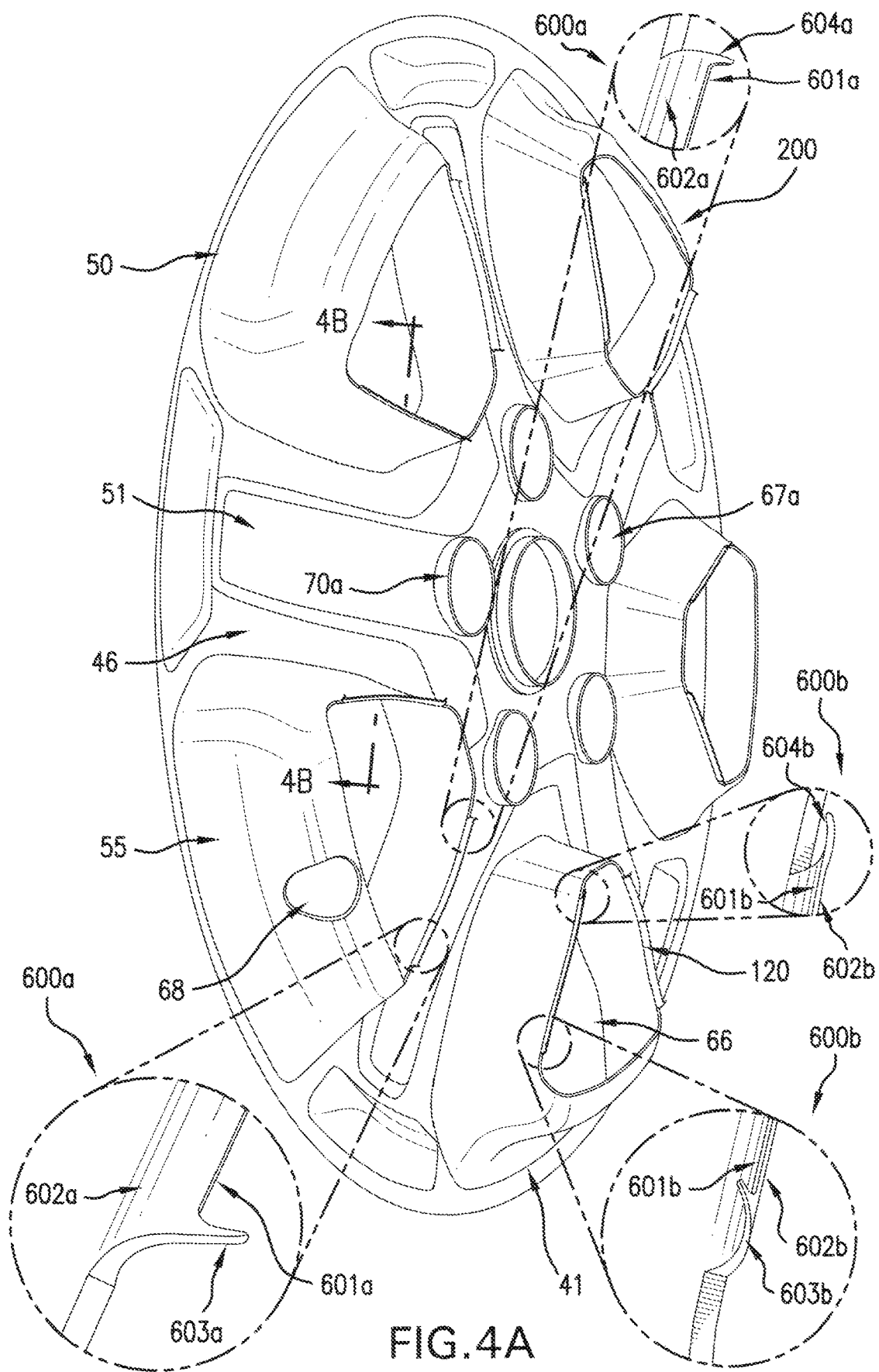
FIG. 4A illustrates an inboard surface area elevated perspective view of the wheel cover overlay of depicting the hook-shaped member snap on technology of the present invention.

Still referring to a preferred embodiment of the present invention, FIG. 4A illustrates a wheel cover overlay 200 comprising an outer boundary peripheral surface area 41, an inboard surface area 46, a plurality of flanges 50 with walls 55 protruding from the inboard surface area 46 of the wheel cover overlay and comprising through holes 66, a plurality of major snap on hook-shaped members 120 protruding from said plurality of flanges, and a plurality of through holes 67a directly carved into the surface of the inboard area 46 for receiving wheel nuts without the support lug nut towers as in FIG. 3. FIG. 4A also has an opening 68 for accommodating an inflation means associated with the tire over whose rim the wheel cover overlay of the present invention is installed.

As depicted in FIG. 4A, The hook-shaped member 120 is manufactured on adjacent plurality of flanges 50 and is comprised of a hook-shaped member portion 600a comprising a rigid polymer lip 601a protruding continuously and axially along the entirety of a rigid polymer longitudinal edge 602a, which is continuously and radially connected to a rigid polymer curved arm edge 603a on one end, and which is continuously and radially connected to a rigid polymer curved arm edge 604a on the opposite end of the hook-shaped member; and a hook-shaped member portion 600b comprising a rigid polymer lip 601b protruding continuously and axially along the entirety of a rigid polymer longitudinal edge 602b, which is continuously and radially connected to rigid polymer curved arm edge 603b on one end, and radially connected to a rigid polymer curved arm edge 604b on the opposite end of the hook-shaped member. It should be noted that the hook-shaped member 600a and the hook-shaped member 600b can be manufactured and alternated on both the major flanges 50 and the minor flanges 51 of the wheel cover overlay with extended surround of the present invention.

The geometric shape of the hook-shaped member portion 600a and the hook-shaped member portion 600b described in FIG. 4A is critical in locking and maintaining in place the wheel cover overlay with extended surround of the present invention when installed. That is, when installed the hook-shaped member's geometric shape makes contact with a vehicle's rim in such a way that prevents separation caused by repeated use of the vehicle which is an enormous advantage over the prior art, as these prior art automotive wheel covers and aftermarket wheel cover overlays are prone to loosen over time with repeated use of the automobile and requiring numerous, labor intensive and costly repairs over the life span of the vehicle.

Figure 4B:
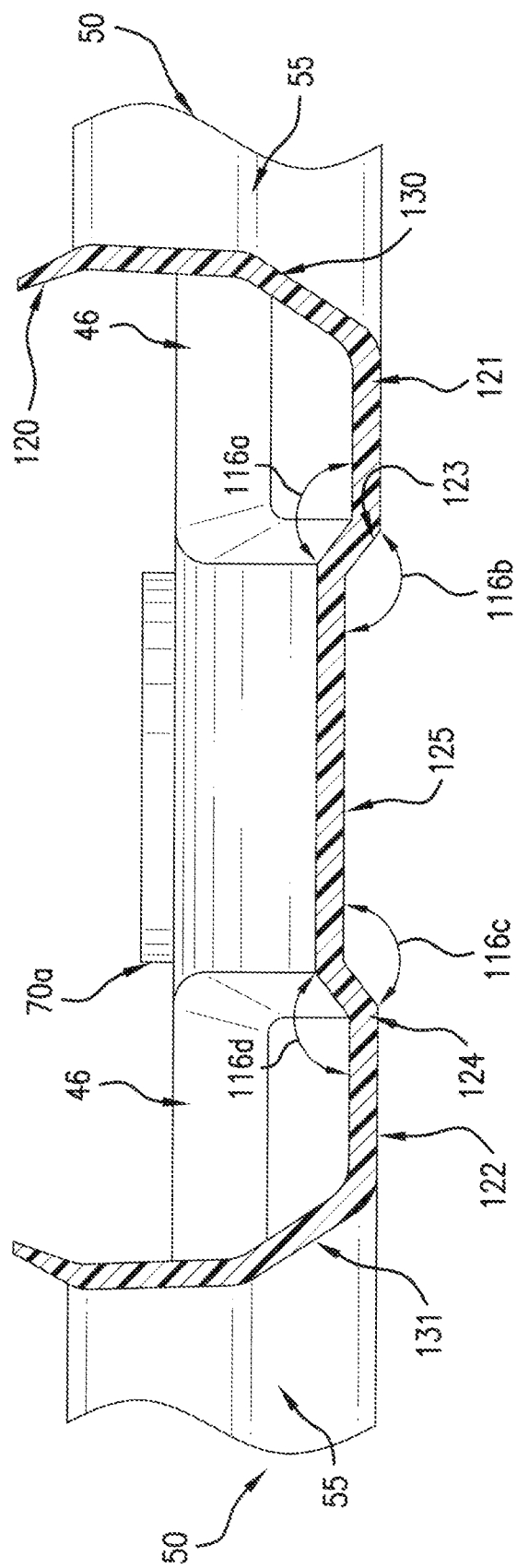
FIG. 4B illustrates a section diagram of FIG. 4A of the wheel cover overlay with extended surround of the present invention.

FIG. 4B illustrates a section diagram of FIG. 4A of the wheel cover overlay with extended surround comprising a rigid polymer longitudinal portion 121 which is connected to a rigid polymer curved portion 130, said rigid polymer longitudinal portion 121 is also connected to a rigid polymer arm edge portion 123, and forms alternate obtuse angles 116a and 116b preferably between 91 degrees 179 degrees. Said rigid polymer arm edge portion 123 is connected to a central and continuously rigid polymer longitudinal portion 125, which is connected to a rigid polymer arm edge portion 124 and forms alternate obtuse angles 116c and 116d with said central and continuously rigid polymer longitudinal portion 125 and, said rigid polymer arm edge portion 124 is connected to a rigid polymer longitudinal portion 122 in turn is connected a rigid polymer curved portion 131.

It should also be noted that the inventor anticipates the rigid polymer arm edge portion 123 and rigid polymer arm edge portion 124 forming right angles (or 90 degrees) and acute angles (or less than 90 degrees) with the rigid polymer longitudinal portion 125 and the rigid polymer longitudinal portion 122 respectively.

Figure 5A:
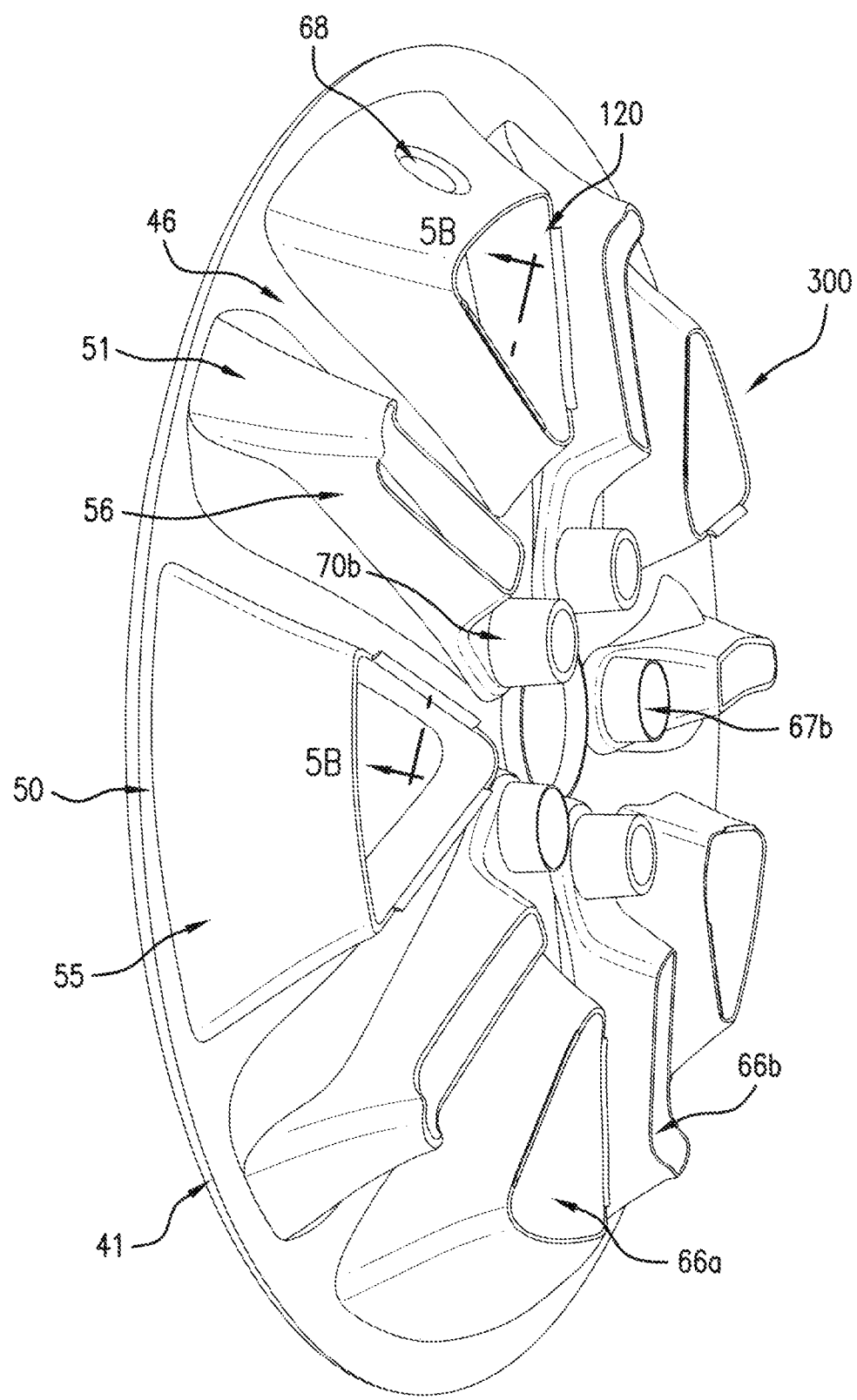
FIG. 5A illustrates an inboard surface area elevated perspective view of the wheel cover overlay with extended surround of the present invention.

Yet still, referring to a preferred embodiment of the present invention, FIG. 5A illustrates a wheel cover overlay with extended surround 300 comprising an outer peripheral boundary surface 41, a inboard surface area 46, a plurality of major flanges 50 with walls 55 protruding from the inboard surface area 46 of the wheel cover overlay with extended surround, a plurality of minor flanges 51 with walls 56 protruding from the inward board surface area 46 of the wheel cover overlay with extended surround, and further comprising major through holes 66a corresponding to the major flanges 50 and minor through holes 66b corresponding to the minor flanges 51, a plurality of major snap on hook-shaped members 120 protruding from said plurality of major flanges, and a plurality of through holes 67b directly carved into the surface area of the inward board 46 for receiving wheel nuts with the supporting lug nut towers 70b. FIG. 5A also has an opening 68 for accommodating an inflation means associated with the tire over which the wheel cover overlay of the present invention is installed.

FIG. 5B illustrates a section diagram of FIG. 5A of the wheel cover overlay with extended surround of the present invention. Specifically, FIG. 5B illustrates a section of the wheel cover overlay with extended surround of the present invention wherein said inboard surface area 46 comprises a right-rigid polymer arm edge 172 which is connected to a right-rigid polymer vertical portion 135. Said rigid polymer arm edge portion 172 which is connected to a rigid polymer longitudinal portion 171 and forms an obtuse angle 117a preferably between 91 degrees and 179 degrees. Said rigid polymer longitudinal portion 171 is connected to a rigid polymer arm edge portion 173 to form an obtuse angle 117b with said rigid polymer longitudinal portion 171. Still referring to FIG. 5B, said rigid polymer arm edge portion 173 is connected to a polymer vertical portion 136.

Further, referring to FIG. 5B a rigid polymer arm edge portion 175 is connected to a rigid polymer vertical portion 137 and a rigid polymer longitudinal portion 174 and forms an obtuse angle 118a preferably between 91 degrees and 179 degrees. Said rigid polymer longitudinal portion 174 is connected to a rigid polymer arm edge portion 176 and forms an obtuse angle 118 preferably between 91 degrees and 179 degrees. Still referring to FIG. 5B, said rigid polymer arm edge portion 176 is connected to a polymer vertical portion 138.

It should also be noted that the inventor anticipates the rigid polymer arm edge portion 175 and the rigid polymer arm edge portion 176 forming right angles (or 90 degrees) and acute angles (or less than 90 degrees) with the rigid polymer longitudinal portion 171 and the rigid polymer longitudinal 174 portion respectively.

Figure 6:
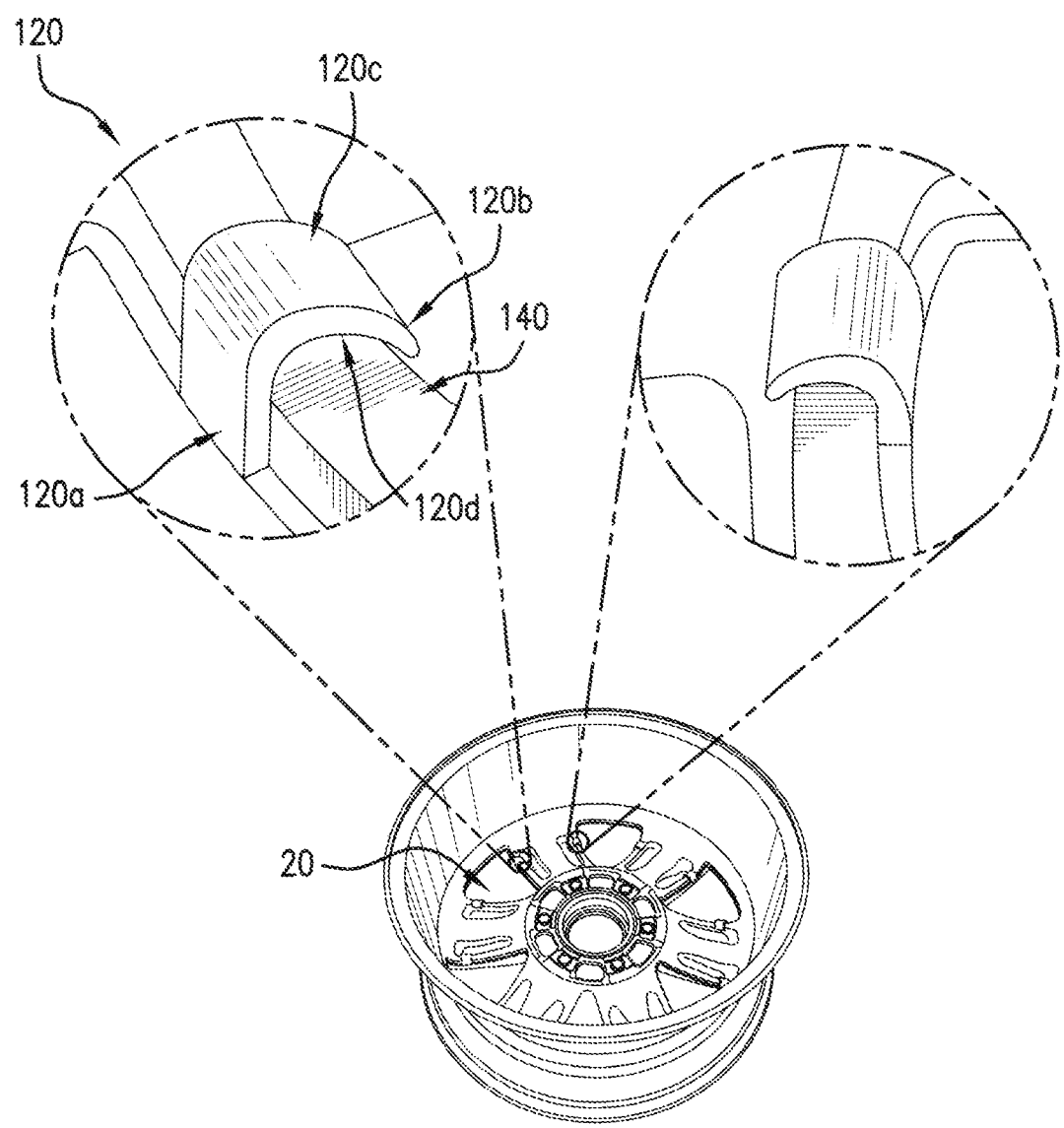
FIG. 6 is an enlarged exploded perspective view of a hook-shaped member of the present invention latched firmly behind an automobile rim.

FIG. 6 is an enlarged exploded perspective view of the present invention's major hook-shaped member 120 latched behind an automobile rim wherein reasonable pressure is applied until said major hook-shaped member snap on technology 120 of the present invention protruding from said flange 50 is snapped over and latches firmly behind a protruding wall not seen of a corresponding mounting slot 20 of an existing and damaged wheel cover 15. Said hook-shaped member 120 is comprised of a rigid polymer longitudinal upper lip arm 120a connected to a rigid polymer longitudinal lower lip arm 120b, wherein said rigid polymer longitudinal upper lip arm 120a and said rigid polymer longitudinal lower lip arm 120b are connected by a rigid polymer acutely curved member 120c to form a continuous rigid polymer surface and a rigid polymer interior region 120d used for snapping on an automotive wheel cover overlay with complete surround of the present invention over an existing manufacturer's wheel cover, and wherein said hook-shaped member 120 latches onto a metal portion 140 of an automobile wheel rim. Said rigid polymer longitudinal lower lip arm is at most 60% of the length of said rigid polymer longitudinal upper lip arm. Hook-shaped members of the present invention with geometric configurations described and labeled as 76b, 76c, 76d, 76e, 76f, 76g, 76h, 76i, 76j and 76k can be used in place of said hook-shaped member described in FIG. 6 to achieve the identical utility result.

Figure 7A:
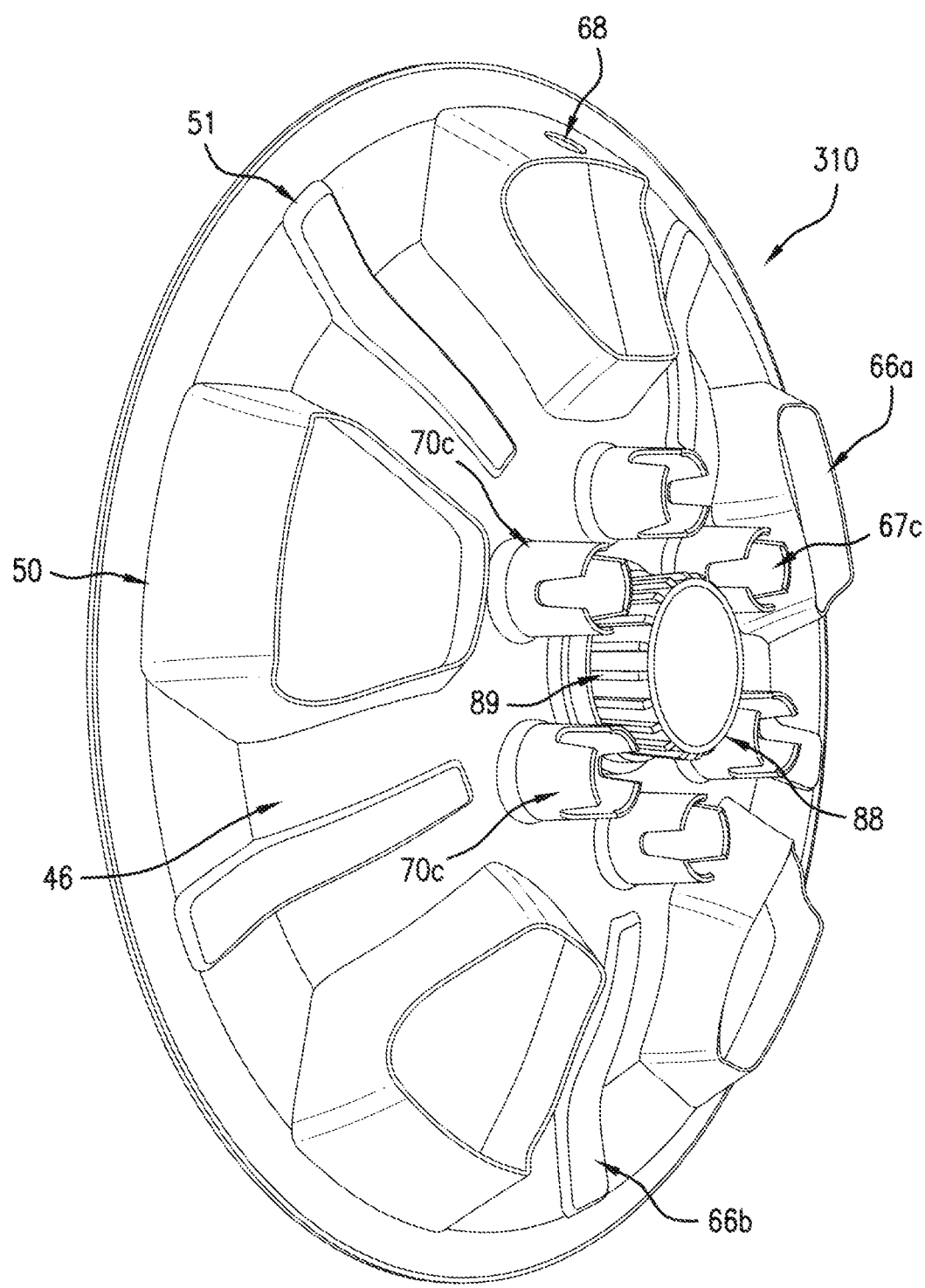
FIG. 7A is a perspective view of a prior art wheel cover overlay without extended surround and with a center rotation device.

FIG. 7A is an example of a prior art wheel cover overlay 310 comprising an inward board surface area 46, lug nut towers 70c projecting from the inward board surface 46, lug nut tower through holes 67c, a major flange 50 projecting from said inboard surface area 46 with an opening 68 therein, a major flange through hole 66a, a minor flange 51 projecting from said inboard surface 46, a minor flange through hole 66*b*, an inserted center rotation device 88 not manufactured in the inward board surface 46, tension tabs 89 manufactured in the inboard surface area 46, wherein when said rotation device is turned clockwise and said tension tabs expand outwards and rest within the cavity of the metal wheel rim of an automobile thereby securing said prior art wheel cover overlay 310 (using the physics of friction only) to a damaged manufacturer's wheel cover.

Figure 7B:
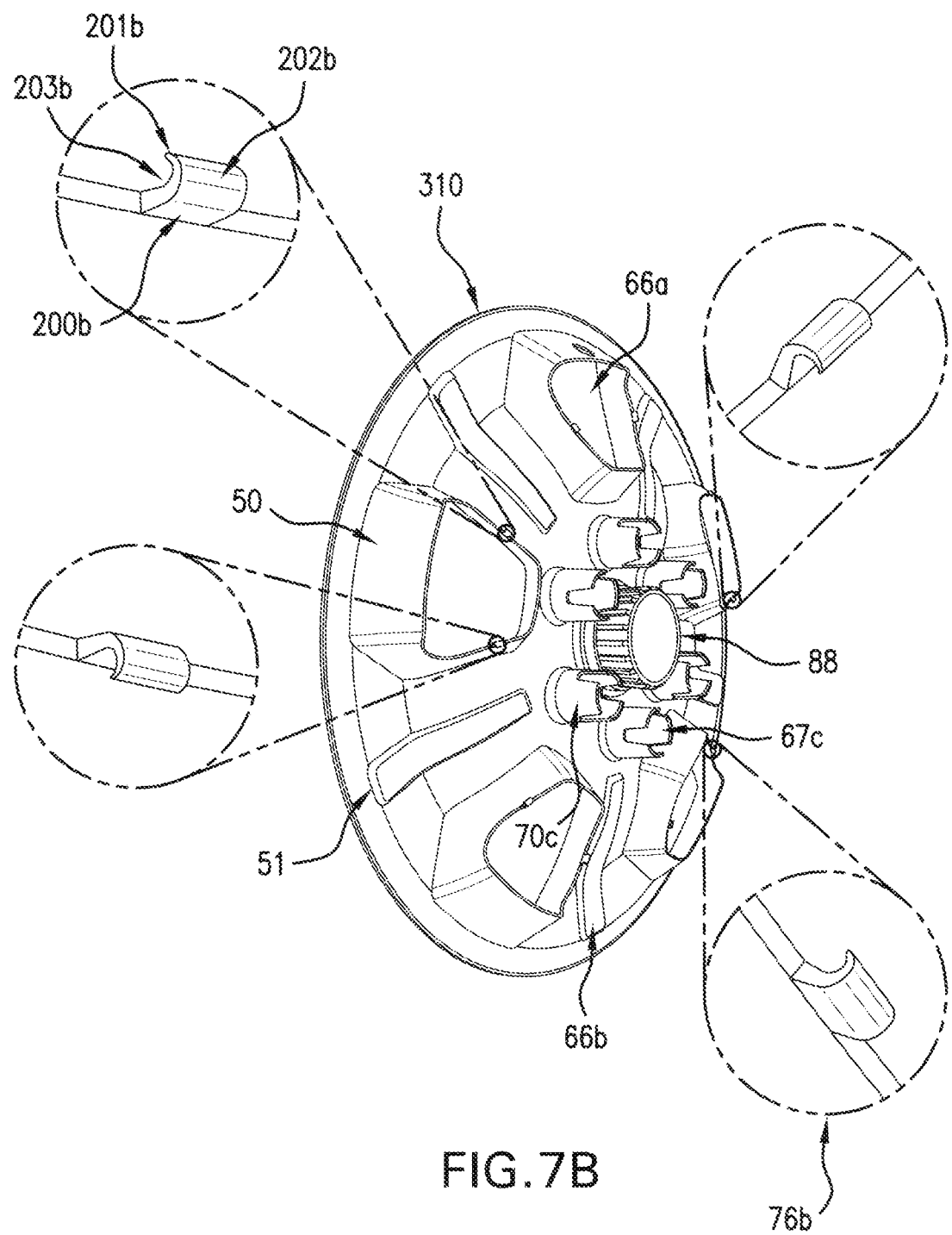
FIG. 7B is an exploded perspective view of a geometric configuration of a hook-shaped member of the snap on technology of the present invention when installed on the flanges of the prior art of FIG. 7A.

FIG. 7B is a preferred embodiment of the present invention wherein the prior art 310 as depicted in FIG. 7A is improved when mounted with a hook-shaped member snap-on technology of the present invention. As shown in FIG. 7B are hook-shaped members represented as 76*b* of the present invention affixed along the circumference of the prior art's wheel cover major flanges 50 as depicted in FIG. 7A. Said hook-shaped members 76*b* are comprised of a rigid polymer longitudinal upper lip arm 200*b* connected to a rigid polymer longitudinal lower lip arm 201*b*, wherein said rigid polymer longitudinal upper lip arm 200*b* and said rigid polymer longitudinal lower lip arm 201*b* are connected by a rigid polymer acutely curved member 202*b* to form a continuous rigid polymer surface and a rigid polymer interior region 203*b* used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm.

Figure 7C:
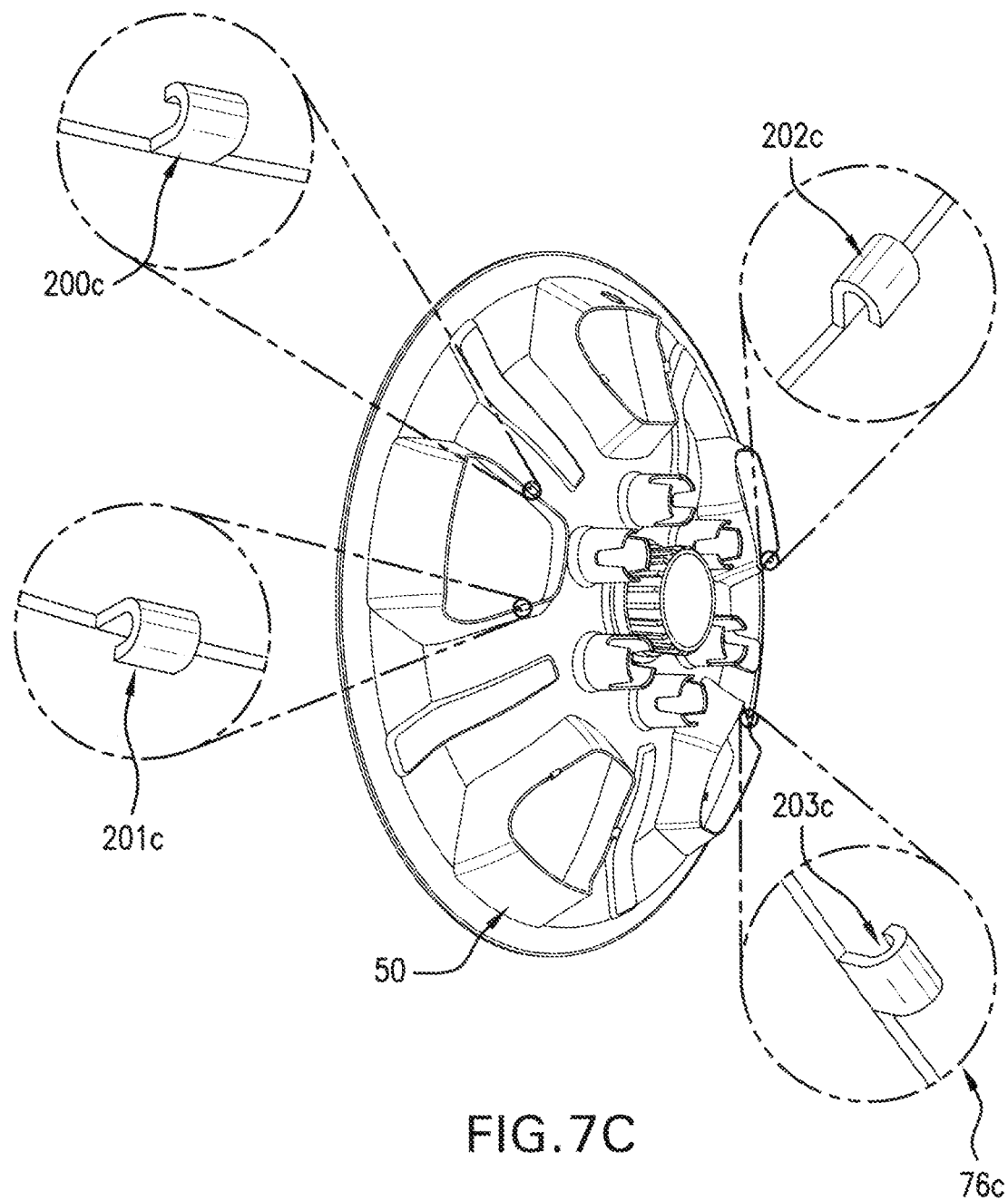
FIG. 7C is an exploded perspective view of a geometric configuration of a hook-shaped member of the snap on technology of the present invention when installed on the flanges of the prior art of FIG. 7A.

FIG. 7C is a preferred embodiment of the present invention wherein the prior art 310 as depicted in FIG. 7A is improved when mounted with the hook-shaped members snap-on technology of the present invention. As shown in FIG. 7C are hook-shaped members represented as 76*c* of the present invention affixed along the circumference of the prior art's wheel cover major flanges 50 as depicted in FIG. 7A. Said hook-shaped members 76*c* are comprised of a rigid polymer longitudinal upper lip arm 200*c* connected to a rigid polymer longitudinal lower lip arm 201*c*, wherein said rigid polymer longitudinal upper lip arm 200*c* and rigid polymer longitudinal lower lip arm 201*c* are connected by a rigid polymer acutely curved member 202*c* to form a continuous rigid polymer surface and a rigid polymer interior region 203*c* used for snapping on an automotive wheel cover overlay with complete surround of the present invention over an existing manufacturer's wheel cover. Said rigid polymer longitudinal lower lip arm is at most 90% of the length of said rigid polymer longitudinal upper lip arm.

Figure 7D:
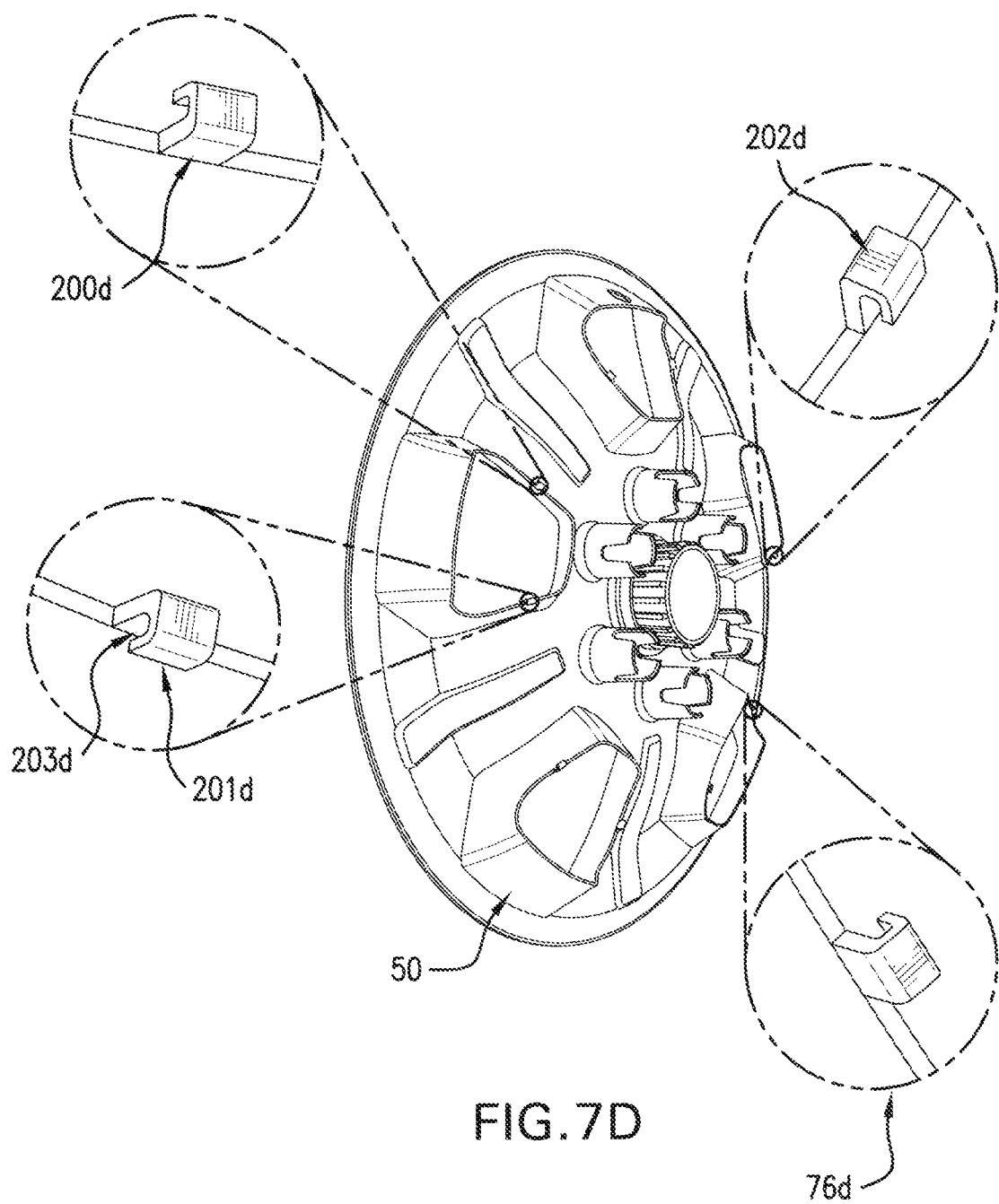
FIG. 7D is an exploded perspective view of a geometric configuration of a hook-shaped member of the snap on technology of the present invention when installed on the flanges of the prior art of FIG. 7A.

FIG. 7D is a preferred embodiment of the present invention wherein the prior art 310 as depicted in FIG. 7A is improved when mounted with the hook-shaped members snap-on technology of the present invention. As shown in FIG. 7D are hook-shaped members represented as 76*d* of the present invention affixed along the circumference of the prior art's wheel cover major flanges 50 as depicted in FIG. 7A. Said hook-shaped members 76*d* are comprised of a rigid polymer longitudinal upper lip arm 200*d* connected to a rigid polymer longitudinal lower lip arm 201*d*, wherein said rigid polymer longitudinal upper lip arm and rigid polymer longitudinal lower lip arm are connected by a rigid polymer rightly curved or obtusely curved member 202*d* to form a continuous rigid polymer surface and a rigid polymer interior region 203*d* used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm.

Figure 7E:
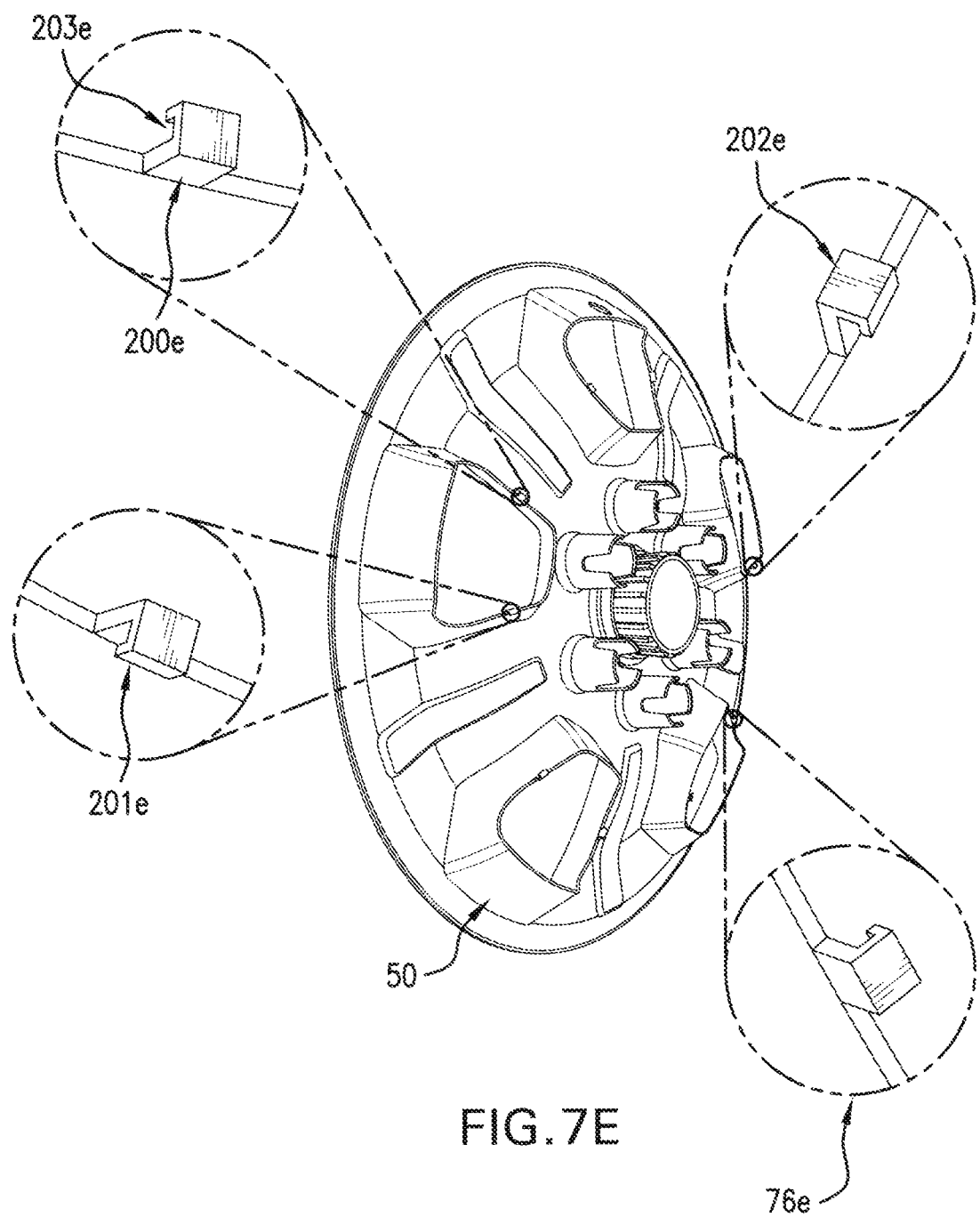
FIG. 7E is an exploded perspective view of a geometric configuration of a hook-shaped member of the snap on technology of the present invention when installed on the flanges of the prior art of FIG. 7A.

FIG. 7E is a preferred embodiment of the present invention wherein the prior art 310 as depicted in FIG. 7A is improved when mounted with the hook-shaped members snap on technology of the present invention. As shown in FIG. 7E are hook-shaped members represented as 76*e* of the present invention affixed along the circumference of the prior art's wheel cover major flanges 50 as depicted in FIG. 7A. Said hook-shaped members 76*e* are comprised of a rigid polymer longitudinal upper lip arm 200*e* connected to a rigid polymer longitudinal lower lip arm 201*e*, wherein said rigid polymer longitudinal upper lip arm and rigid polymer longitudinal lower lip arm are connected by a rigid polymer perpendicular member 202*e* to form a continuous rigid polymer surface and a rigid polymer interior region 203*e* used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm.

Figure 7F:
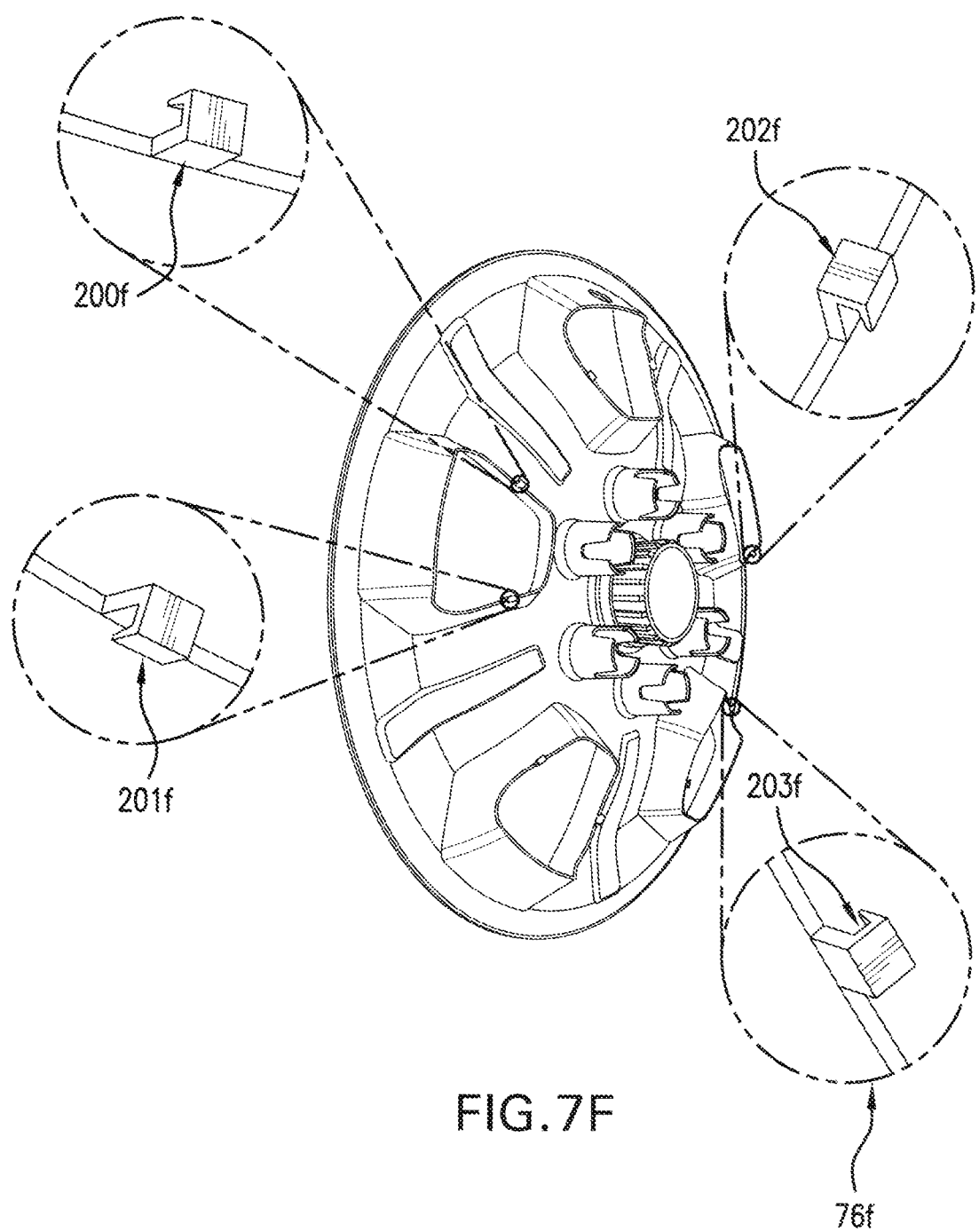
FIG. 7F is an exploded perspective view of a geometric configuration of a hook-shaped member of the snap on technology of the present invention when installed on the flanges of the prior art of FIG. 7A.

As in FIG. 7E above, FIG. 7F is a preferred embodiment of the present invention wherein the prior art 310 as depicted in FIG. 7A is improved when mounted with the hook-shaped members snap on technology of the present invention. As shown in FIG. 7F are hook-shaped members represented as 76*f* of the present invention affixed along the circumference of the prior art's wheel cover major flanges 50 as depicted in FIG. 7A. Said hook-shaped members 76*f* are comprised of a rigid polymer longitudinal upper lip arm 200*f* connected to a rigid polymer longitudinal lower lip arm 201*f*, wherein said rigid polymer longitudinal upper lip arm and rigid polymer longitudinal lower lip arm are connected by a rigid polymer perpendicular member 202*f* to form a continuous rigid polymer surface and a rigid polymer interior region 203*f* used for snapping on an automotive wheel cover overlay with complete surround of the present invention over an existing manufacturer's wheel cover. Said rigid polymer longitudinal lower lip arm is at most 90% of the length of said rigid polymer longitudinal upper lip arm.

Figure 7G:
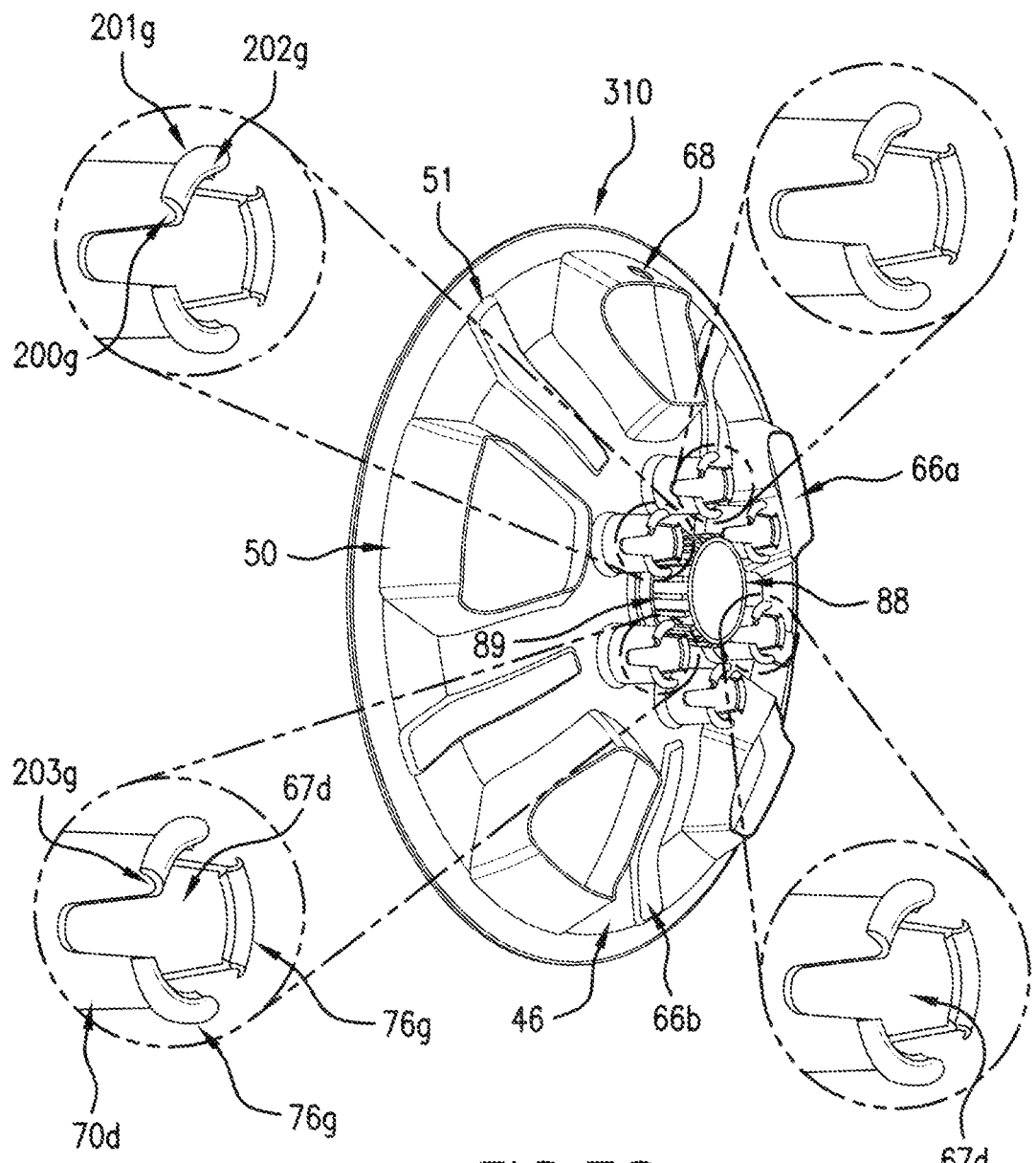
FIG. 7G is an exploded perspective view of a geometric configuration of a hook-shaped member of the snap on technology of the present invention when installed on the lug nut towers of the prior art of FIG. 7A.

Still referring to a preferred embodiment, FIG. 7G is the prior art wheel cover 310 depicted in FIG. 7A comprising an inward board surface area 46, lug nut towers 70*d* projecting from the inward board surface area 46, lug nut tower through holes 67*d*, at least one major flange 50 projecting from said inward board surface area 46 with an opening 68 therein and comprising a major flange through hole 66*a*, at least one a minor flange 51 projecting from said inward board surface 46 and comprising a minor flange through hole 66*b*, an inserted center rotation device 88, and at least one elongated prong 89 manufactured within the inward board surface area and used for securing said prior art wheel to a damaged manufacturer's wheel cover.

Still referring to FIG. 7G, said lug nut towers 70*d* are affixed with the hook-shaped members snap-on technology of the present invention. Said hook-shaped members 76*g* affixed to said lug nut towers 70*d* are comprised of a rigid polymer longitudinal upper lip arm 200*g* connected to a rigid polymer longitudinal lower lip arm 201*g*, wherein said rigid polymer longitudinal upper lip arm 200*g* and said rigid polymer longitudinal lower lip arm 201*g* are connected by a rigid polymer acutely curved and indented member 202*g* to form a continuous rigid polymer surface and a rigid polymer interior region 203*g* used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm.

Figure 7H:
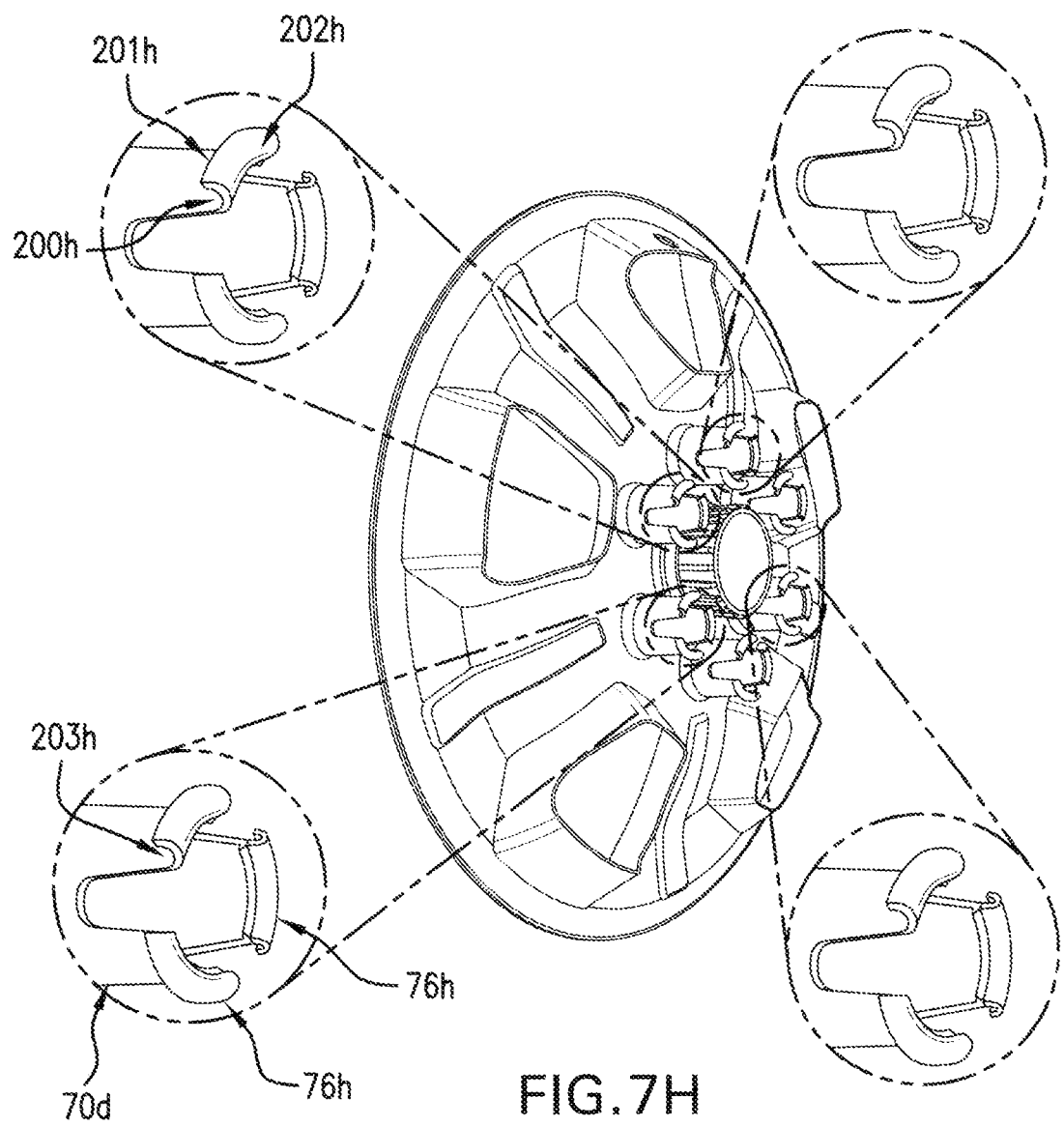
FIG. 7H is an exploded perspective view of a geometric configuration of a hook-shaped member of the snap on technology of the present invention when installed on the lug nut towers of the prior art of FIG. 7A.

FIG. 7H, a preferred embodiment, depicts said lug nut towers 70*d* being affixed with the hook-shaped members snap-on technology of the present invention. Said hook-shaped members 76*h* affixed to said lug nut towers 70*d* are comprised of a rigid polymer longitudinal upper lip arm 200*h* connected to a rigid polymer longitudinal lower lip arm 201*h*, wherein said rigid polymer longitudinal upper lip arm 200*h* and rigid polymer longitudinal lower lip arm 201*h* are connected by a rigid polymer acutely curved and indented member 202*h* to form a continuous rigid polymer surface and a rigid polymer interior region 203*h* used for snapping on an automotive wheel cover overlay with complete surround of the present invention over an existing manufacturer's wheel cover. Said rigid polymer longitudinal lower lip arm is at most 30% of the length of said rigid polymer longitudinal upper lip arm.

Figure 7I:
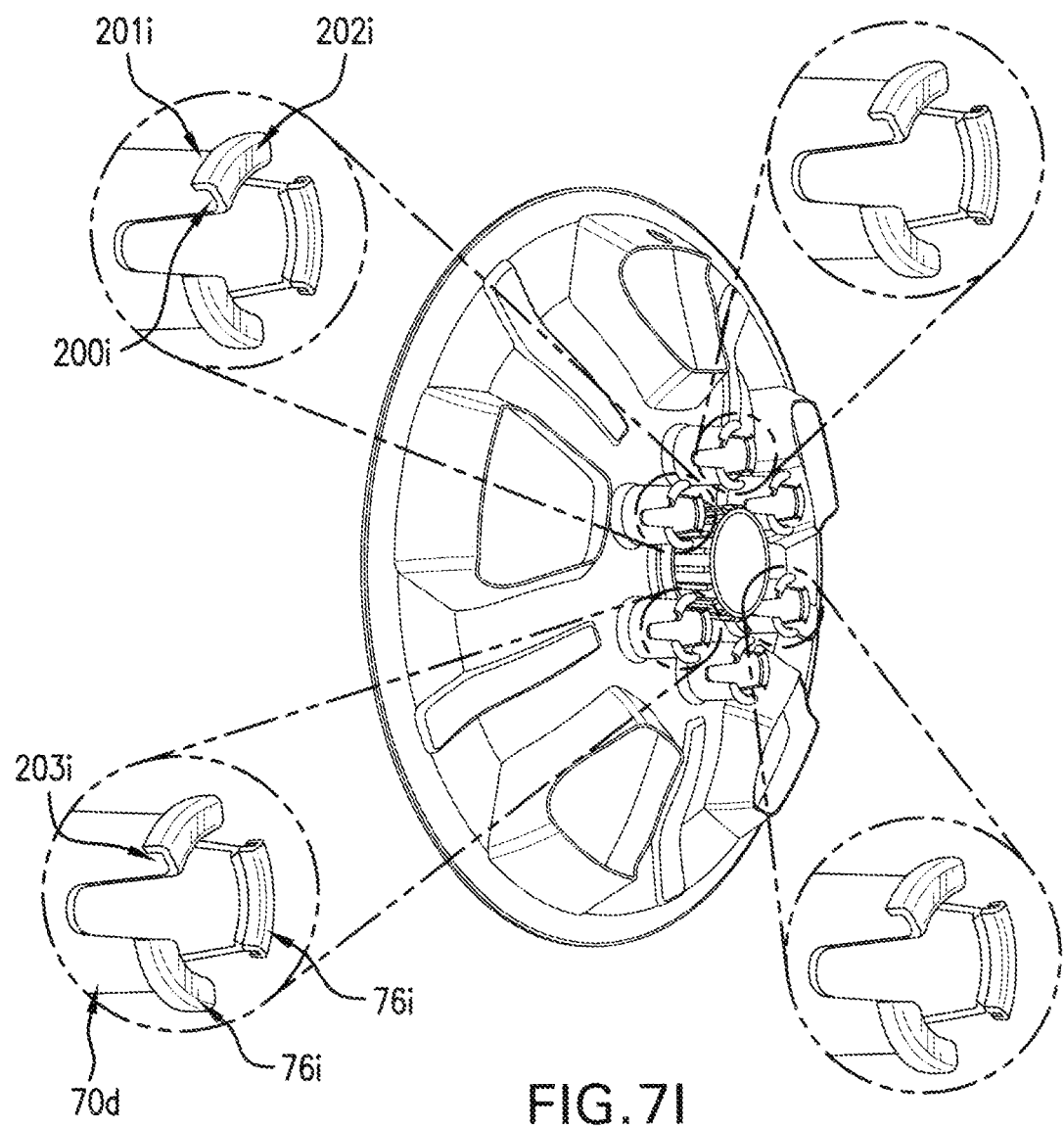
FIG. 7I is an exploded perspective view of a geometric configuration of a hook-shaped member of the snap on technology of the present invention when installed on the lug nut towers of the prior art of FIG. 7A.

Similarly, FIG. 7I is a preferred embodiment which depicts said lug nut towers 70*d* being affixed with the hook-shaped members snap-on technology of the present invention. Said hook-shaped members 76*i* affixed to said lug nut towers 70*d* are comprised of a rigid polymer longitudinal upper lip arm 200*i* connected to a rigid polymer longitudinal lower lip arm 201*i*, wherein said rigid polymer longitudinal upper lip arm 200*i* and said rigid polymer longitudinal lower lip arm 201*i* are connected by a rigid polymer perpendicularly curved and indented member 202*i* to form a continuous rigid polymer surface and a rigid polymer interior region 203*i* used for snapping on an automotive wheel cover overlay with complete surround of the present invention over an existing manufacturer's wheel cover. Said rigid polymer longitudinal lower lip arm is at most 40% of the length of said rigid polymer longitudinal upper lip arm.

Figure 7J:
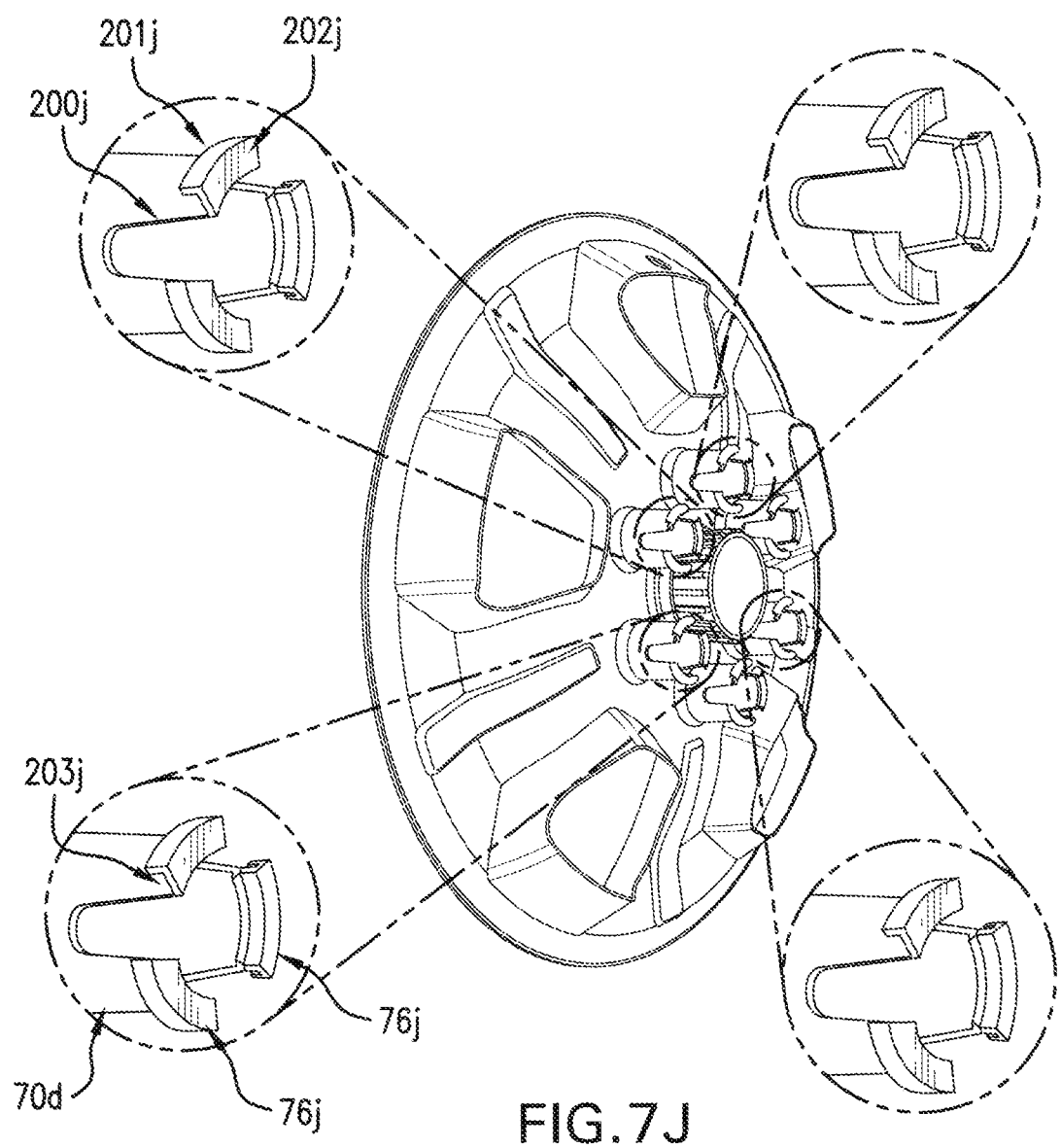
FIG. 7J is an exploded perspective view of a geometric configuration of a hook-shaped member of the snap on technology of the present invention when installed on the lug nut towers of the prior art of FIG. 7A.

Still, FIG. 7J is a preferred embodiment which depicts said lug nut towers 70*d* being affixed with the hook-shaped members snap-on technology of the present invention. Said hook-shaped members 76*j* affixed to said lug nut towers 70*d* are comprised of a rigid polymer longitudinal upper lip arm 200*j* connected to a rigid polymer longitudinal lower lip arm 201*j*, wherein said rigid polymer longitudinal upper lip arm 200*j* and said rigid polymer longitudinal lower lip arm 201*j* are connected by a rigid polymer perpendicularly curved and indented member 202*j* to form a continuous rigid polymer surface and a rigid polymer interior region 203*j* used for snapping on an automotive wheel cover overlay with complete surround of the present invention over an existing manufacturer's wheel cover. Said rigid polymer longitudinal lower lip arm is at most 60% of the length of said rigid polymer longitudinal upper lip arm.

Figure 7K:
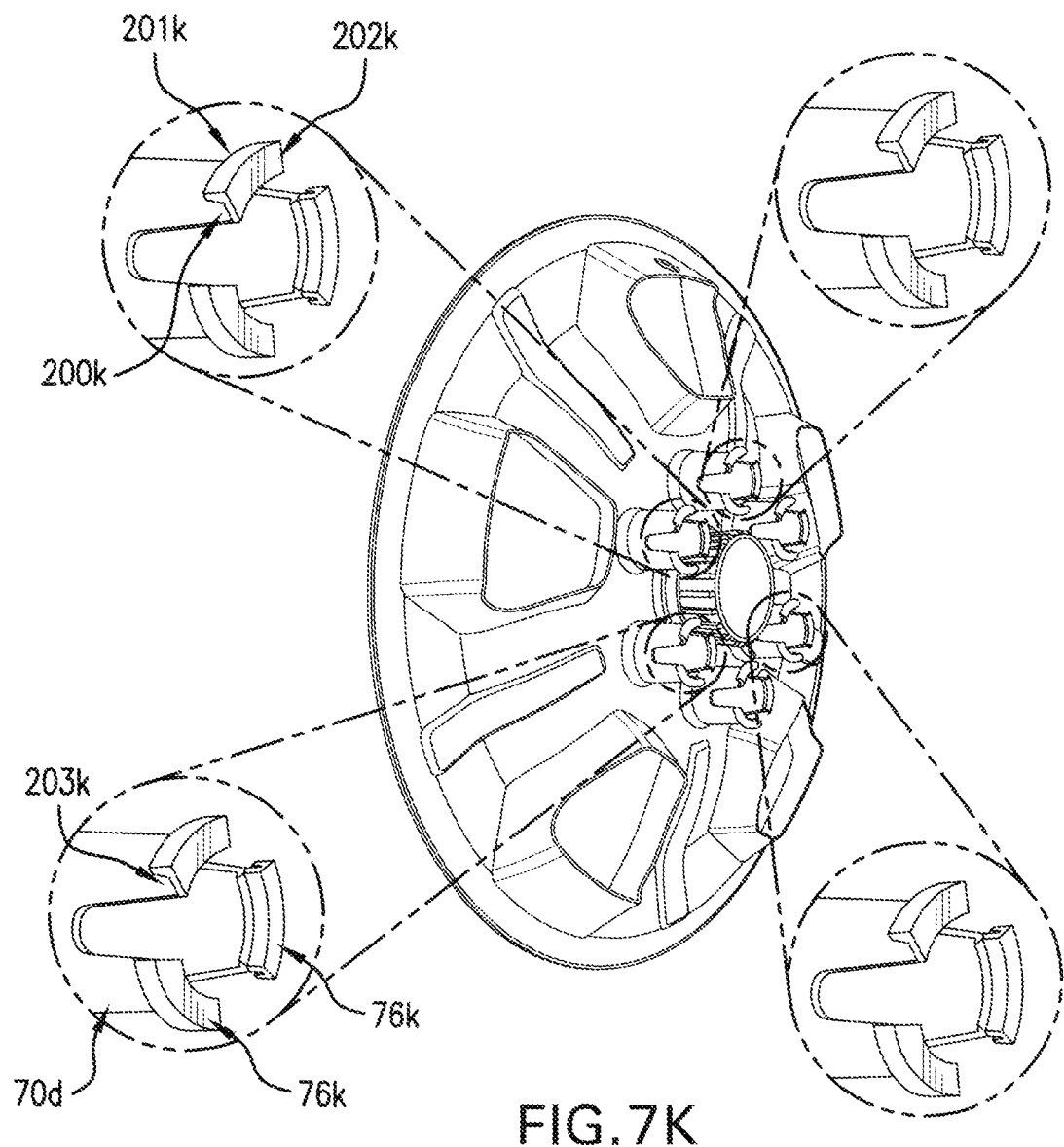
FIG. 7K is an exploded perspective view of a geometric configuration of a hook-shaped member of the snap on technology of the present invention when installed on the lug nut towers of the prior art of FIG. 7A.

Yet still, FIG. 7K is a preferred embodiment which depicts said lug nut towers 70*d* being affixed with the hook-shaped members snap-on technology of the present invention. Said hook-shaped members 76*k* affixed to said lug nut towers 70*d* are comprised of a rigid polymer longitudinal upper lip arm 200*k* connected to a rigid polymer longitudinal lower lip arm 201*k*, wherein said rigid polymer longitudinal upper lip arm 200*k* and said rigid polymer longitudinal lower lip arm 201K are connected by a rigid polymer perpendicularly curved and indented member 202*k* to form a continuous rigid polymer surface and a rigid polymer interior region 203*k* used for snapping on an automotive wheel cover overlay with complete surround of the present invention over an existing manufacturer's wheel cover. Said rigid polymer longitudinal lower lip arm is at most 45% of the length of said rigid polymer longitudinal upper lip arm.

It should be noted that the hook-shaped members affixed externally to said lug nut towers as described in the preferred embodiments of FIGS. 7G, 7H, 7I, 7J and 7*k* can be manufactured within the through holes 67*d* of said lug nut towers 70*d*, or better still on the reserve ends or opposite positions of the current positions of the hook-shaped members as depicted and described. As such said hook-shaped members manufactured within the through holes 67*c* of said lug nuts tower 70*c* will have the same geometric shape as the affixed hook-shaped members described in 76*b*, 76*c*, 76*d*, 76*e*, 76*f*, 76*g*, 76*h* and 76*i* of the present invention.

Figure 8A:
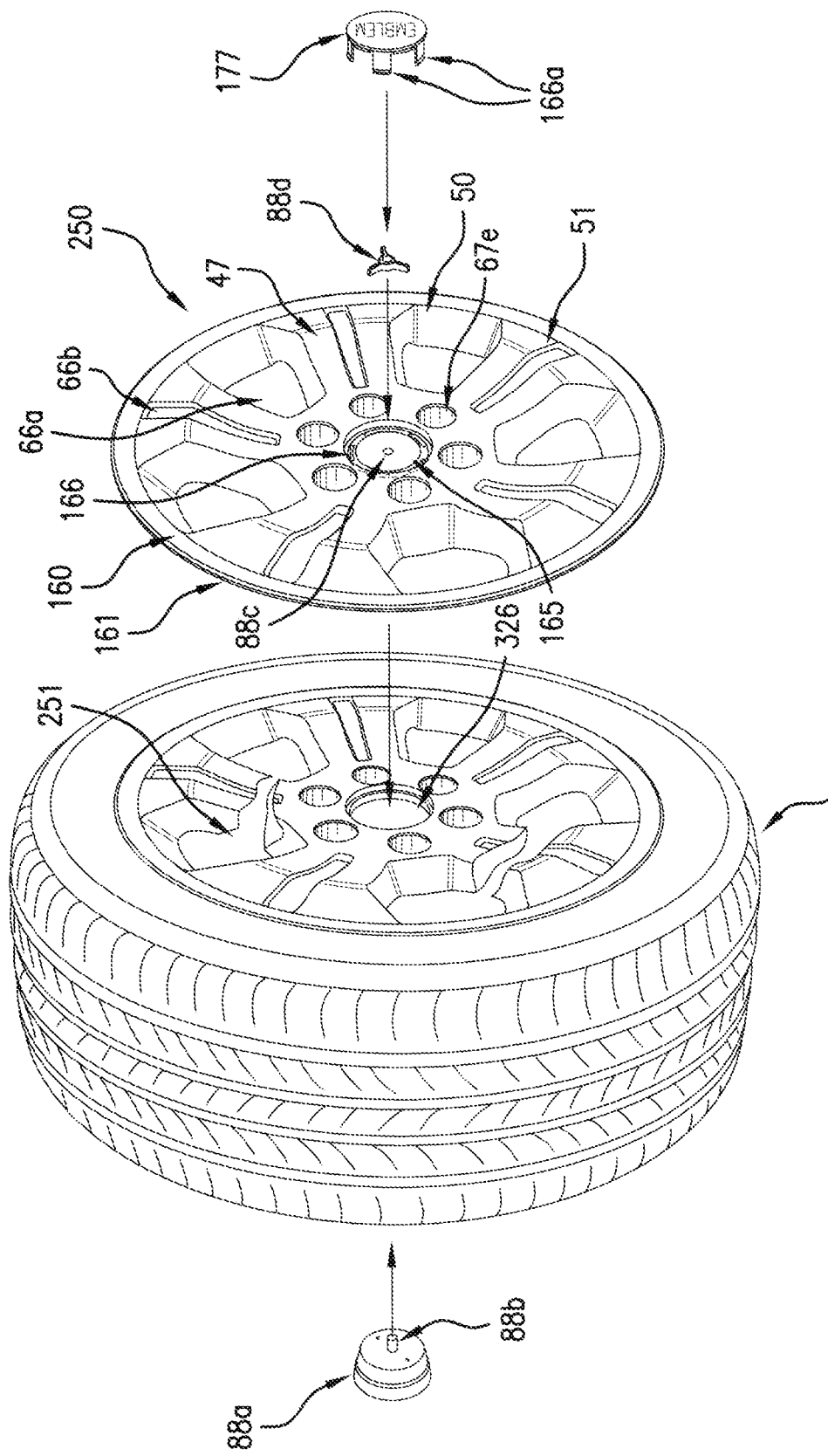
FIG. 8A is a perspective view illustrating component types and outboard surface area orientation of the wheel cover overlay with extended surround of the present invention's tension rotation fastening system prior to installation over a damaged manufacturer's wheel cover.

Referring to a preferred embodiment of the present invention, FIG. 8A illustrates a damaged manufacturer's wheel cover 251 prior to the installation of the wheel cover overlay with extended surround of the present invention 250. Still referring to FIG. 8A, said wheel cover overlay with extended surround of the present invention 250 is comprised of an outboard surface area 47 in which there exist within at least one major flange 50, at least one minor flange 51, at least one lug nut tower through hole 67*e*, at least one major flange through hole 66*a*, at least one minor flange through hole 66*b*, a wheel cover overlay peripheral boundary 160, and a wheel cover overlay peripheral extended surround 161.

Still referring to FIG. 8A, the wheel cover overlay with extended surround of the present invention has a tension tab guide plate 165 containing at least one tension tab guide plate slit 166, which can be manufactured to remain fixed in place permanently or can be manufactured as a separate plate to be screwed in an out as needed. The quantity of tension tab guide plate slits 166 manufactured within said tension tab guide plate 165 corresponds to said tension tabs 166*a* of a specific automobile emblem support device 177.

During installation of the wheel cover overlay with extended surround of the present invention 250 over an existing damaged manufacturer's wheel cover 251, as depicted in FIG. 8A, the wheel cover overlay with extended surround 250 is installed over the damaged manufacturer's wheel cover 251 by centering said wheel cover overlay with extended surround tension tab guide plate 165 directly over the tire rim opening 326 of the tire 325 containing the damaged manufacturer's wheel cover 251. When snapped in placed over an existing damaged manufacturer's wheel cover 251, the wheel cover overlay with extended surround of the present invention 250, in addition to the presence of FIG. 4A hook-shaped members on its flanges for securing the latter to the former, is secured by inserting a tension rotation device 88*a* from the reversed position of the tire 325 to land between manufactured in place wheel cover overlay tension tabs not shown. In addition, a tension rotation device prong 88*b* of a tension rotation device 88*a* penetrates through a tension rotation device prong's corresponding opening 88*c*. Said tension red tab rotation device is secured in said tension tabs assembly 500, not seen, but containing the manufactured in place wheel cover overlay tension tabs by the use of a tension rotation device fastener 88*d*, after which said automobile emblem cover 177 with said tension tabs 166*a* corresponding to said tension tabs guide plate slits 166 is inserted to further secure the wheel cover overlay with extended surround of the present invention to an existing damaged manufacturer's wheel cover 251.

Figure 8B:
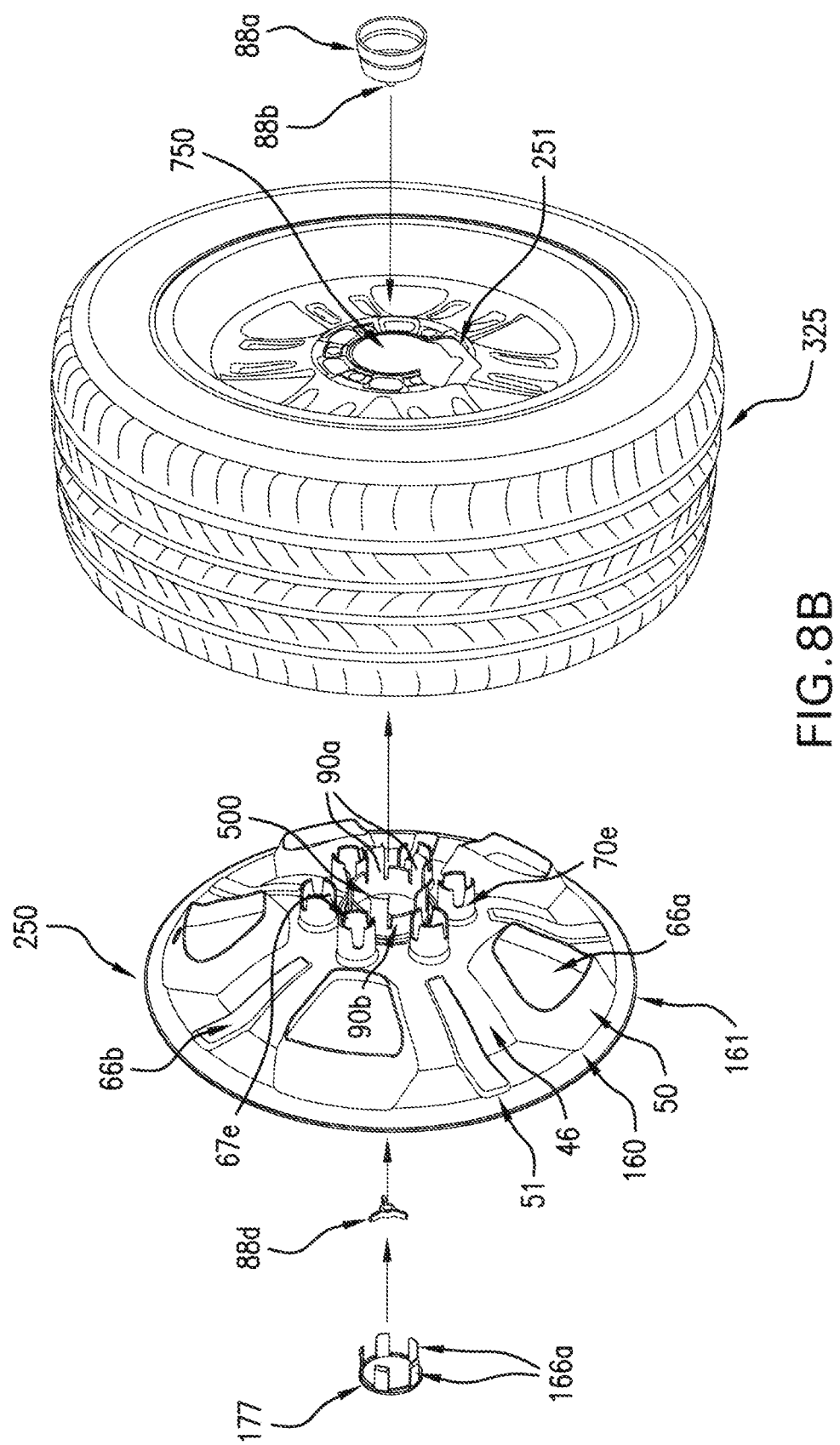
FIG. 8B is a perspective view illustrating component types and in board surface area orientation of the wheel cover overlay with extended surround of the present invention's tension rotation fastening system prior to installation over a damaged manufacturer's wheel cover.

FIG. 8B depicts the installation steps using the reverse side view of the wheel cover overlay with extended surround comprising the steps of: first, snapping over the wheel cover overlay with extended surround 250 of the present invention over an existing damaged manufacturer's wheel cover previously installed on a rim of an automobile tire 325, wherein said wheel cover overlay with extended surround 250 is comprised of an inboard surface area 46 comprising at least one major flange 50, at least one minor flange 51, at least one lug nut tower 70*e*, at least one lug nut tower through hole 67*e*, at least one major flange through hole 66*a*, at least one minor flange through hole 66*b*, a wheel cover overlay peripheral boundary 160, and a wheel cover overlay peripheral extended surround 161. In the central portion of said inboard surface area 46 is said wheel cover overlay tension tabs assembly 500 comprising at least one major tension tab 90a and at least one minor tension tab 90b. Second, inserting a tension rotation device 88a having a tension rotation device prong 88b through a through hole 750 of the damaged manufacturer's wheel cover 251 into the cavity of the wheel cover overlay tension tabs assembly 500 of the present invention as described both in FIG. 8A and FIG. 8B. Third, using said tension rotation device fastener 88d to tighten said tension rotation device 88a clockwise within the cavity of said wheel cover overlay tabs assembly 500 until said major tension tabs 90a expand outwards and latches behind the walls of the tire 325 metal rim using its hook-shaped members described in FIG. 9 below. Fourth and finally, said automobile emblem support device 177 with said tension tabs 166a corresponding to said tension tabs guide plate slits 166 as described in FIG. 8A is inserted to further secure the wheel cover overlay with extended surround of the present invention to an existing damaged manufacturer's wheel cover 251.

Figure 8C:
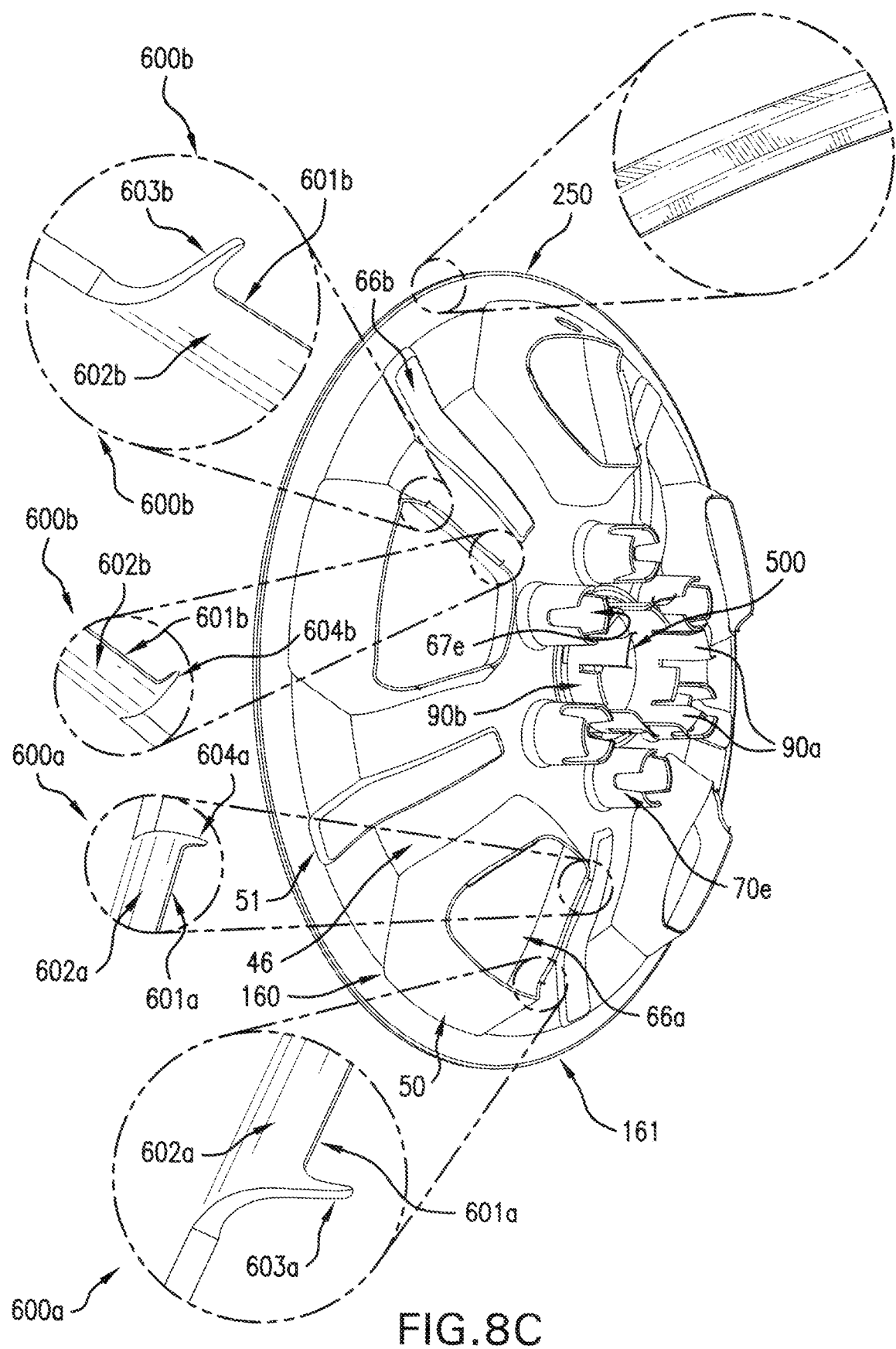
FIG. 8C is an exploded perspective view illustrating the inward board surface area of the present invention comprising a tension tab assembly, hook-shaped members and an extended surround of the present invention.

Referring to FIG. 8C, the wheel cover overlay with extended surround of the present invention 250 is comprised of an inboard surface area 46, at least one major flange, at least one minor flange 51, at least one lug nut tower 70e, at least one lug nut tower through hole 67e, at least one major flange through hole 66a, at least one minor flange through hole 66b, a wheel cover overlay peripheral boundary 160, and a wheel cover overlay peripheral extended surround 161. In the central portion of said inboard surface area 46 is said wheel cover overlay tension tabs assembly 500 comprising at least one major tension tab 90a and at least one minor tension tab 90b. Still referring to FIG. 8C, the hook-shaped member 120 is manufactured on adjacent plurality of flanges 50 and is comprised of a hook-shaped member portion 600a comprising a rigid polymer lip 601a protruding continuously and axially along the entirety of a rigid polymer longitudinal edge 602a, which is continuously and radially connected to a rigid polymer curved arm edge 603a on one end, and which is continuously and radially connected to a rigid polymer curved arm edge 604a on the opposite end of the hook-shaped member, and a hook-shaped member 600b comprising a rigid polymer lip 601b protruding continuously and axially along the entirety of a rigid polymer longitudinal edge 602b, which is continuously and radially connected to a rigid polymer curved arm edge 603b on one end and radially connected to a rigid polymer curved arm edge 604b on the opposite end of the hook-shaped member. It should be noted that the hook-shaped member 600a and the hook-shaped member—can be manufactured and alternated on both the major flanges 50 and the minor flanges 51 of the wheel cover overlay with extended surround of the present invention.

Figure 9:
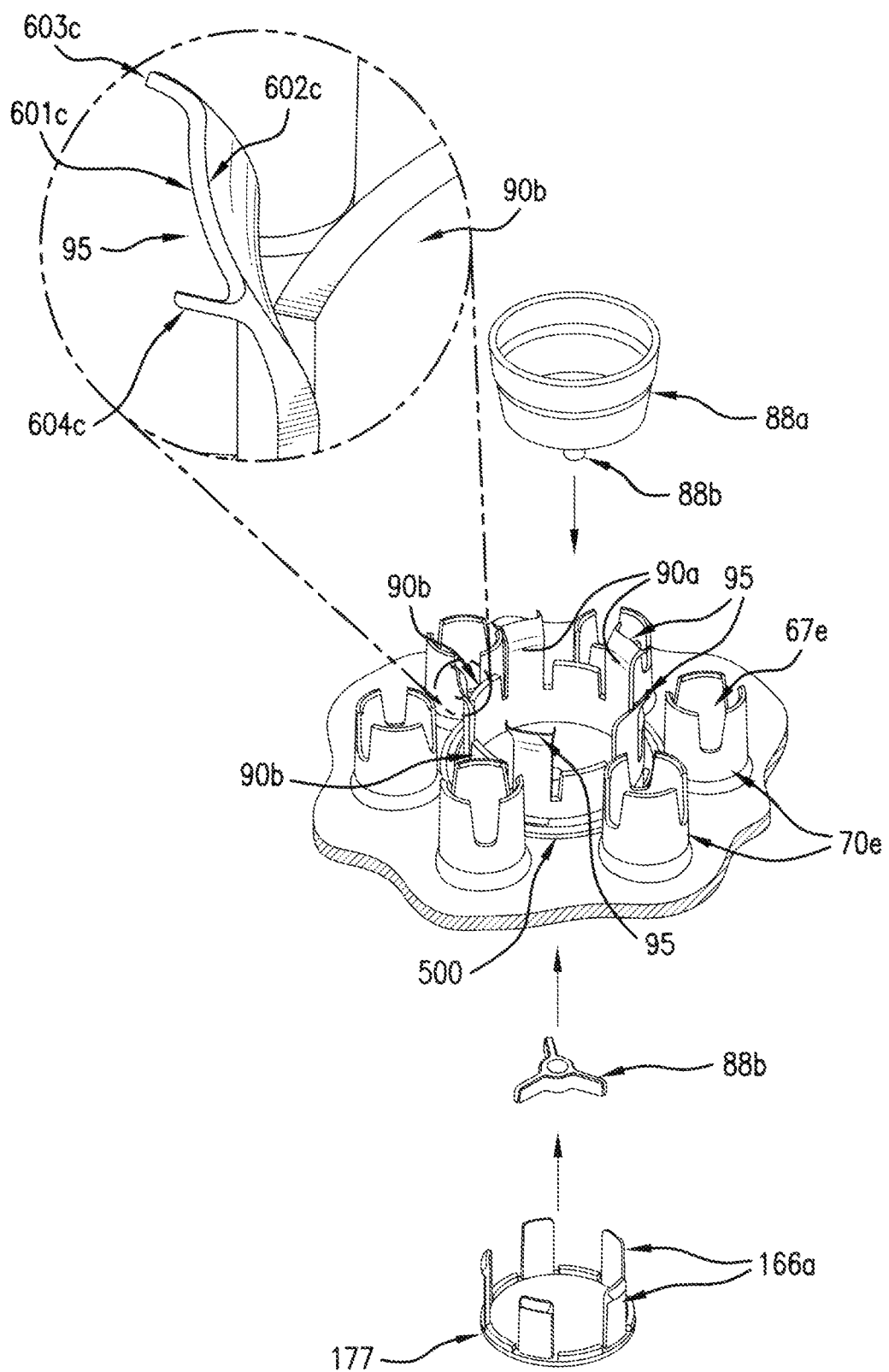
FIG. 9 is an exploded perspective view illustrating the installation orientation of the major component parts of the wheel cover overlay with extended surround of the present invention's tension rotation fastening system.

FIG. 9 depicts an exploded view of the central cross sectional area of the wheel cover overlay with extended surround of the present invention comprising at least one lug nut tower 70e, at least one lug nut tower through hole 67e, and said wheel cover overlay tension tabs assembly 500 comprising at least on major tension tab 90a containing the hook-shaped member 95 of the present invention, and at least one minor tension tab 90b. Still referring to FIG. 9, there is depicted an exploded view of the hook-shaped member 95 comprised of a rigid curved polymer lip 601c protruding continuously and axially along the entirety of a rigid polymer longitudinal edge 602c, which is continuously and radially connected to a rigid polymer curved arm edge 603c on one end, and is continuously and radially connected to a rigid polymer curved arm edge 604c on the opposite end of the hook-shaped member 95. The geometric shape of the hook-shaped member 95 described in FIG. 9 is critical in locking and maintaining in place the wheel cover overlay with extended surround of the present invention when installed. That is, when installed the hook-shaped member's 95 geometric shape makes contact with a vehicle's rim in such a way that prevents separation caused by repeated use of the vehicle which is a an enormous advantage over the prior art, as these prior art automotive wheel covers and aftermarket wheel cover overlays are prone to loosen over time with repeated use of the vehicle, and requiring numerous, labor intensive and costly repairs over the life span of the vehicle.

Figure 10A:
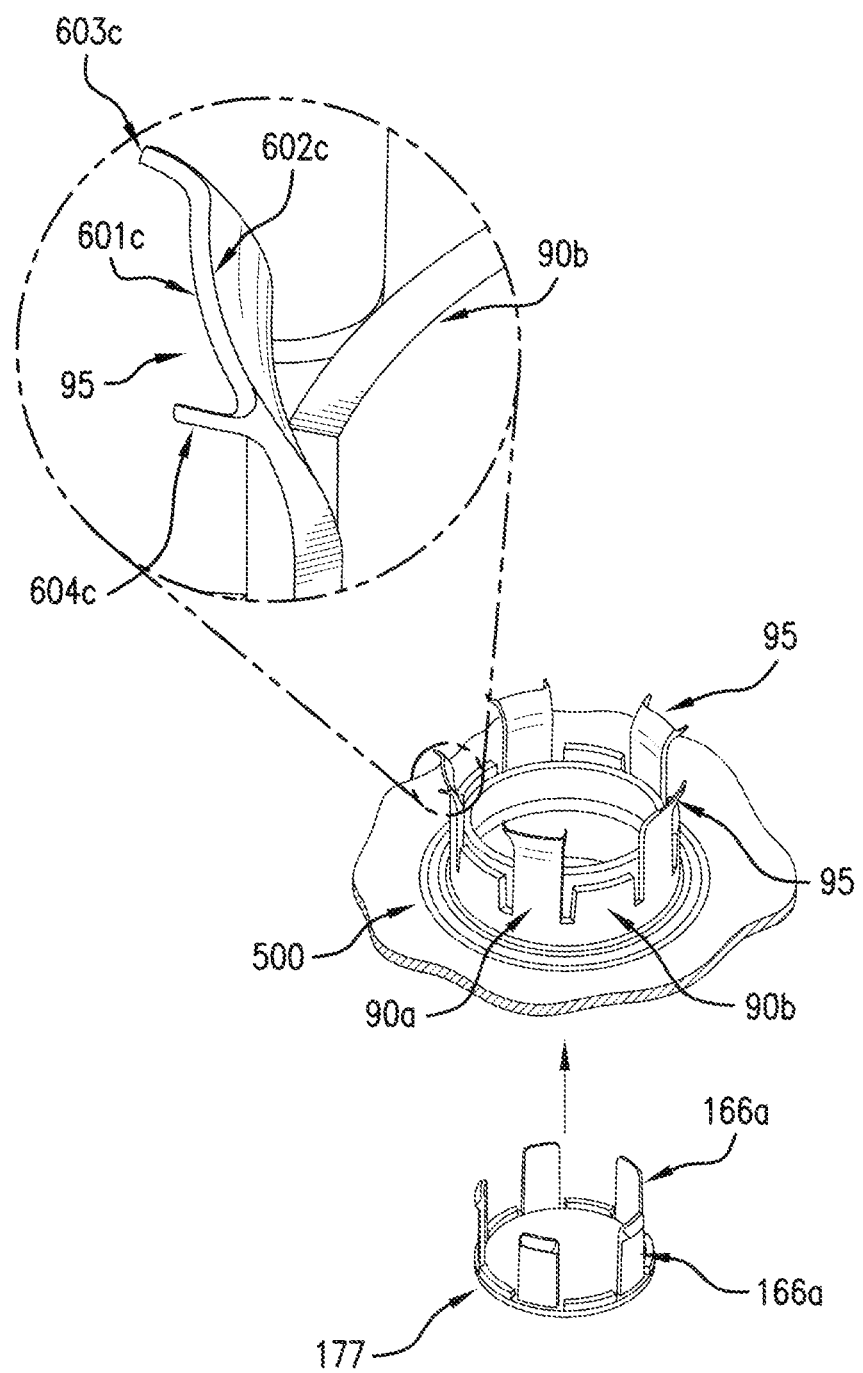
FIG. 10A is an exploded perspective view illustrating the orientation of the wheel cover overlay with extended surround of the present invention's tension tabs assembly and automobile emblem support device prior to installation.
Figure 10B:
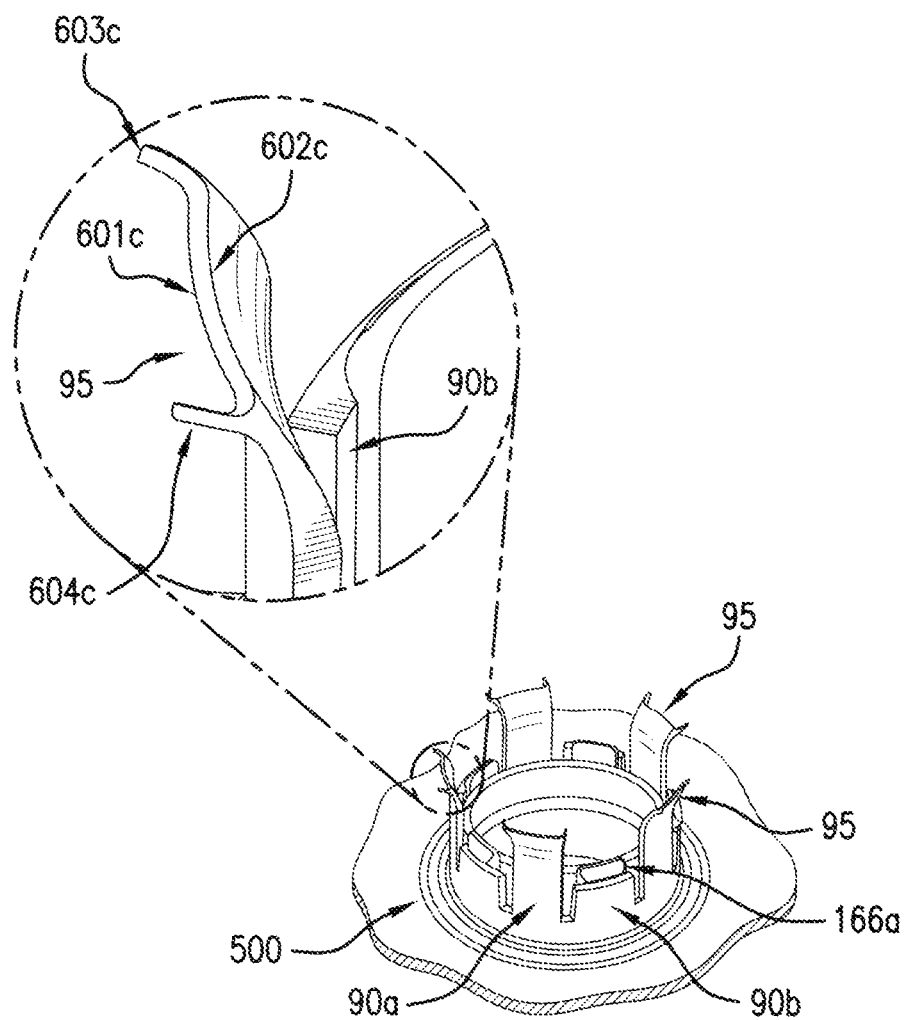
FIG. 10B is an exploded perspective view illustrating the locking orientation and configuration after the emblem support device is inserted and installed within the tension tabs assembly of the present invention.

FIG. 10A and FIG. 10B depicts the emblem support device 177 prior to and after being fitted within the wheel cover overlay tension tabs assembly 500, wherein said tension tabs 166a of an automobile emblem support device 177 is fitted within said wheel cover overlay tension tabs assembly 500 by snapping over said minor tension tabs 90b of said wheel cover overlay tension tabs assembly 500 of the present invention. The unengaged major tension tabs 90a of said wheel cover overlay tension tabs assembly 500 tilt outwardly when said rotation tension device 88a shown in FIG. 9 is tightened using the tension rotation device fastener 88d also shown in FIG. 9, until said hook-shaped members 95 of said major tension tabs 90a snap into grooves embedded in the rear surface area of a rim of a vehicle.

Still referring to FIG. 10A and FIG. 10B, the hook-shaped member 95 is comprised of a rigid curved polymer lip 601c protruding continuously and axially along the entirety of a rigid polymer longitudinal edge 602c, which is continuously and radially connected to a rigid polymer right-side curved arm edge 603c on one end, and is continuously and radially connected to a rigid polymer curved arm edge 604c on the opposite end of the hook-shaped member 95. The geometric shape of the hook-shaped member 95 described in FIG. 9 is critical in locking and maintaining in place the wheel cover overlay with extended surround of the present invention when installed. That is, when installed the hook-shaped member's 95 geometric shape makes contact with the vehicle's rim in such a way that prevents separation caused by repeated use of the vehicle which is an enormous advantage over the prior art, as these prior art automotive wheel covers and aftermarket wheel cover overlays are prone to loosen over time with repeated use of the vehicle, and requiring numerous, labor intensive and costly repairs over the life span of the vehicle.

Figure 10C:
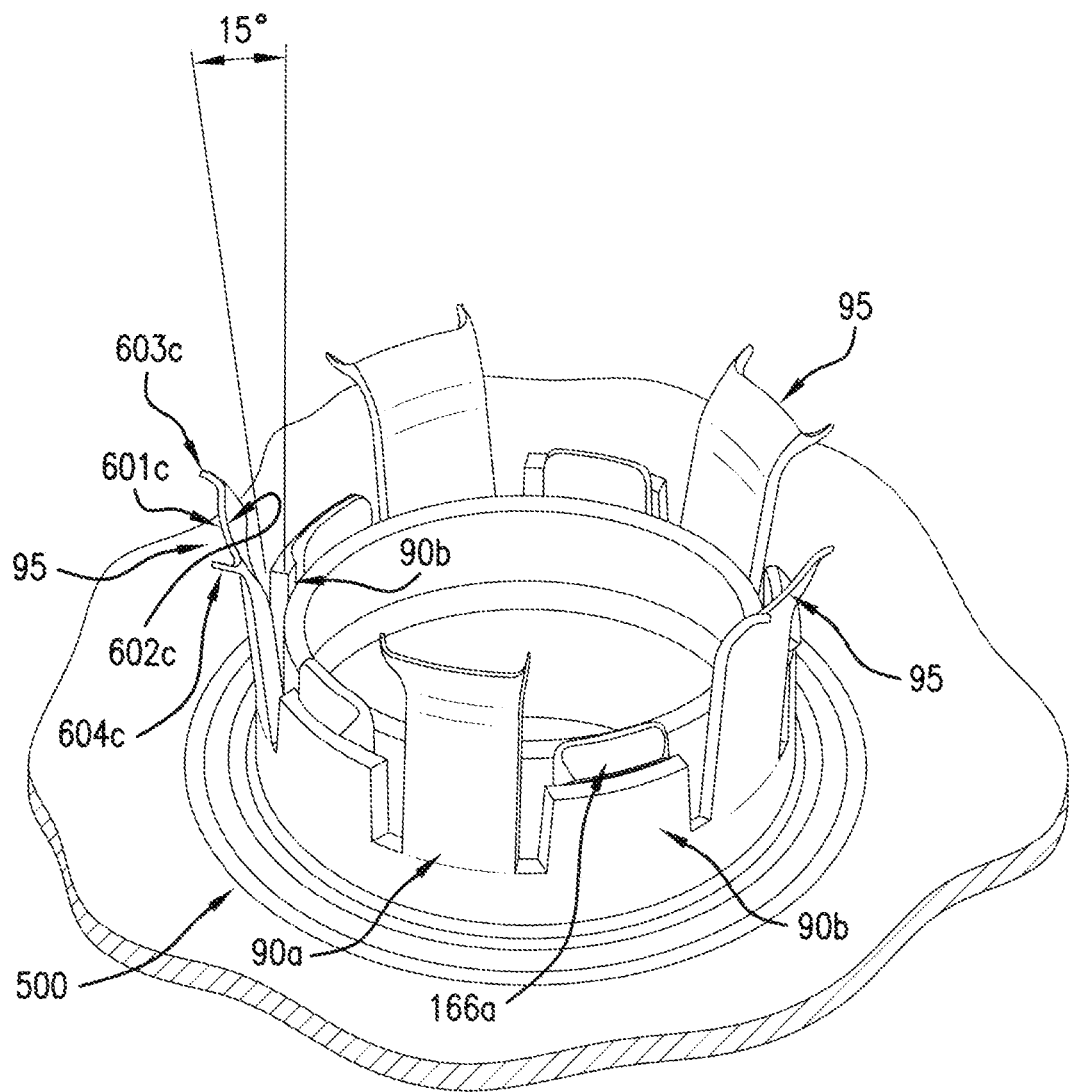
FIG. 10C is an exploded perspective view illustrating the major tension tabs manufactured at an angle of about fifteen (15) degrees and the locking orientation and configuration after the emblem support device is inserted and installed within the tension tabs assembly of the present invention.

FIG. 10C illustrates said wheel cover overlay tension tabs assembly 500 manufactured the within wheel cover overlay with extended surround of the present invention 250, wherein said tension tabs 166a of a vehicle's emblem support device 177 as described in FIG. 10A is fitted within said wheel cover overlay tension tabs assembly 500 by snapping over said minor tension tabs 90b of said wheel cover overlay tension tabs assembly 500 of the present invention. The unengaged major tension tabs 90a of said wheel cover overlay tension tabs assembly 500 is capable of being manufactured up to a deviation of about fifteen (15) degrees measured from the position of the minor tension tabs 90b, such that the need for a rotation tension device 88a and for a tension rotation device fastener 88d as shown in FIG. 8A might not be needed. That is, the tension tabs assembly 500 with said major tension tabs 90a comprising hook-shaped members 95 manufactured at about a deviation of fifteen (15) degrees is capable of snapping into grooves embedded in the rear surface area of a rim of a vehicle without the need for a rotation tension device 88a and a tension rotation device fastener 88d.

Still referring to FIG. 10C, in addition to the fifteen (15) degrees angle, the hook-shaped member 95 is held in place without the need for a rotation tension device 88a nor a need for a tension rotation device fastener 88d because the hook-shaped member 95 is comprised of a rigid curved polymer lip 601c protruding continuously and axially along the entirety of a rigid polymer longitudinal edge 602c, which is continuously and radially connected to a rigid polymer curved arm edge 603c on one end, and is continuously and radially connected to a rigid polymer curved arm edge 604c on the opposite end of the hook-shaped member 95. The geometric shape of the hook-shaped member 95 described in FIG. 9 is critical in locking and maintaining in place the wheel cover overlay with extended surround of the present invention when installed. That is, when installed the hook-shaped member's geometric shape along with the up to fifteen (15) degrees at which it is manufactured in the overlay 250 of the present invention makes contact with the vehicle's rim in such a way that prevents separation caused by repeated use of the vehicle which is a enormous advantage over the prior art, as these prior art automotive wheel covers and aftermarket wheel cover overlays are prone to loosen over time with repeated use of a vehicle, and requiring numerous, labor intensive and costly repairs over the life span of the vehicle.

Figure 11:
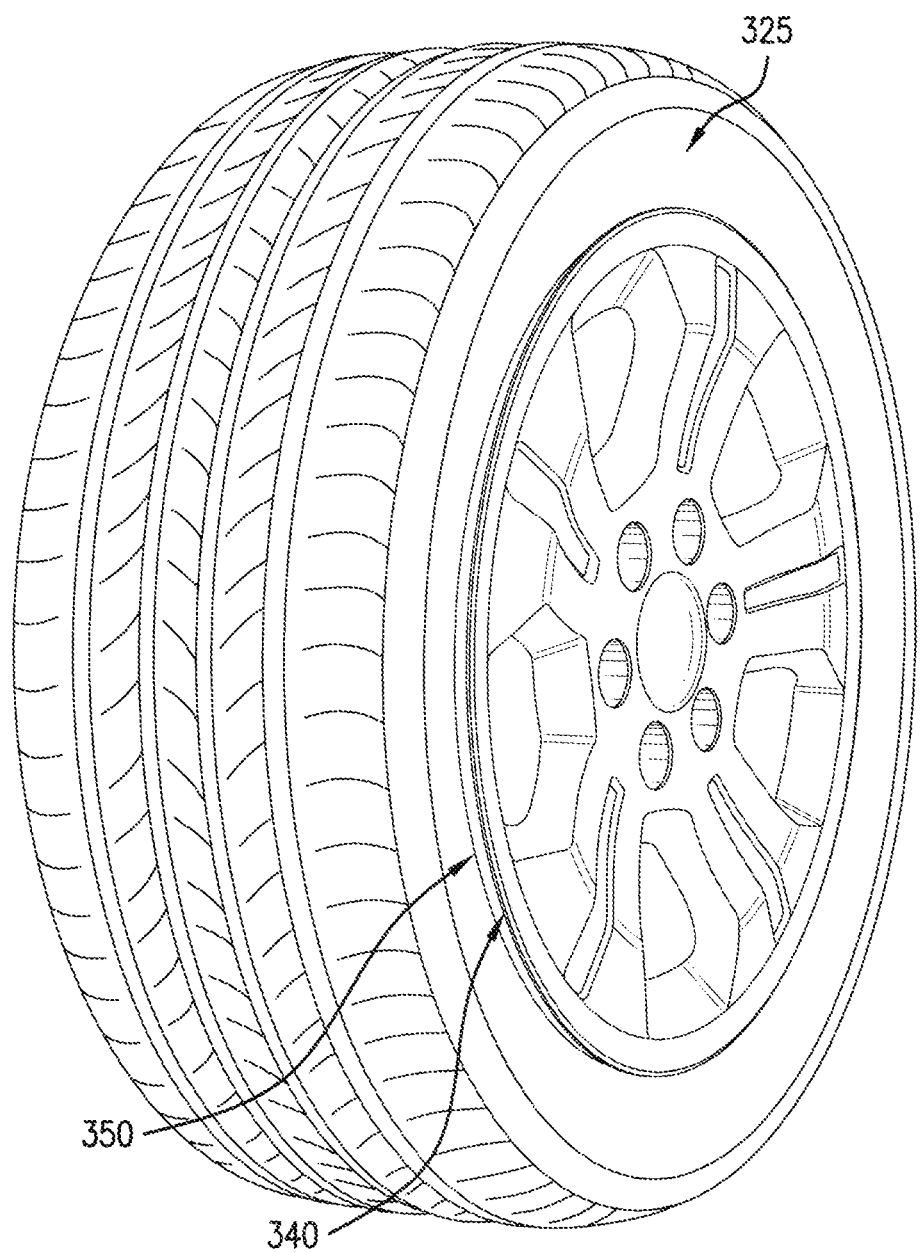
FIG. 11 illustrates a prior art's installed wheel cover overlay without extended surround, wherein upon installation over a damaged manufacturer's wheel cover a vehicle's rim on which a vehicle's car tire is mounted is exposed.

One key distinction between the prior art's wheel cover overlay, for example as depicted in FIG. 7A, and the present invention's wheel cover overlay with extended surround is the extent to which their respective wheel cover overlay extends over an automobile rim when snapped into place over an existing damaged manufacturer's wheel cover. Reasoning alene along those lines, FIG. 11 illustrates an installed wheel cover overlay 340 of the prior art, wherein a vehicle's rim 350 on which a vehicle's car tire 325 is mounted is exposed after installation of the wheel cover overlay 340 of the prior art.

Figure 12A:
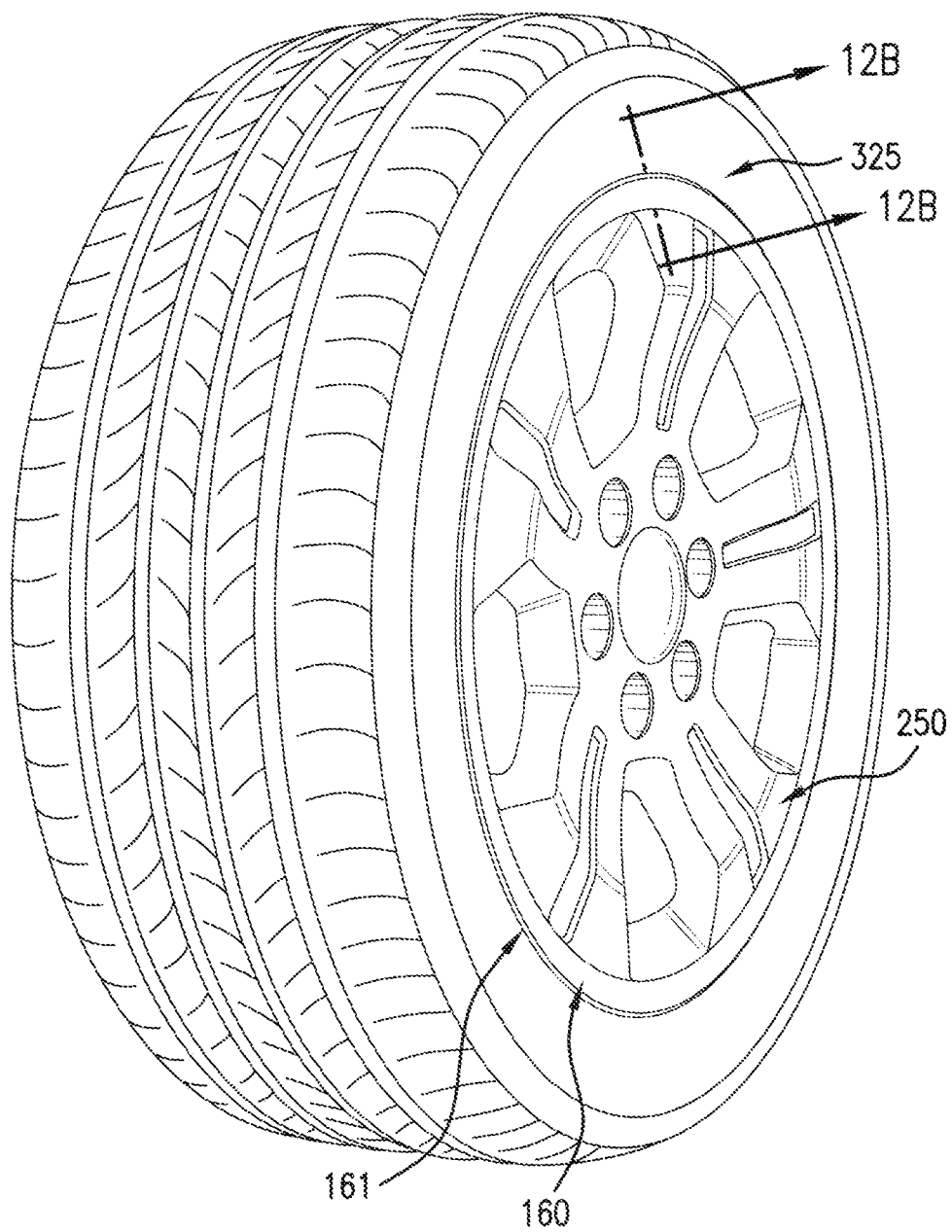
FIG. 12A illustrates the wheel cover overlay with extended surround of the present invention, wherein upon installation over a damaged manufacturer's wheel cover a vehicle's rim on which a vehicle's car tire is mounted is not exposed.
Figure 12B:
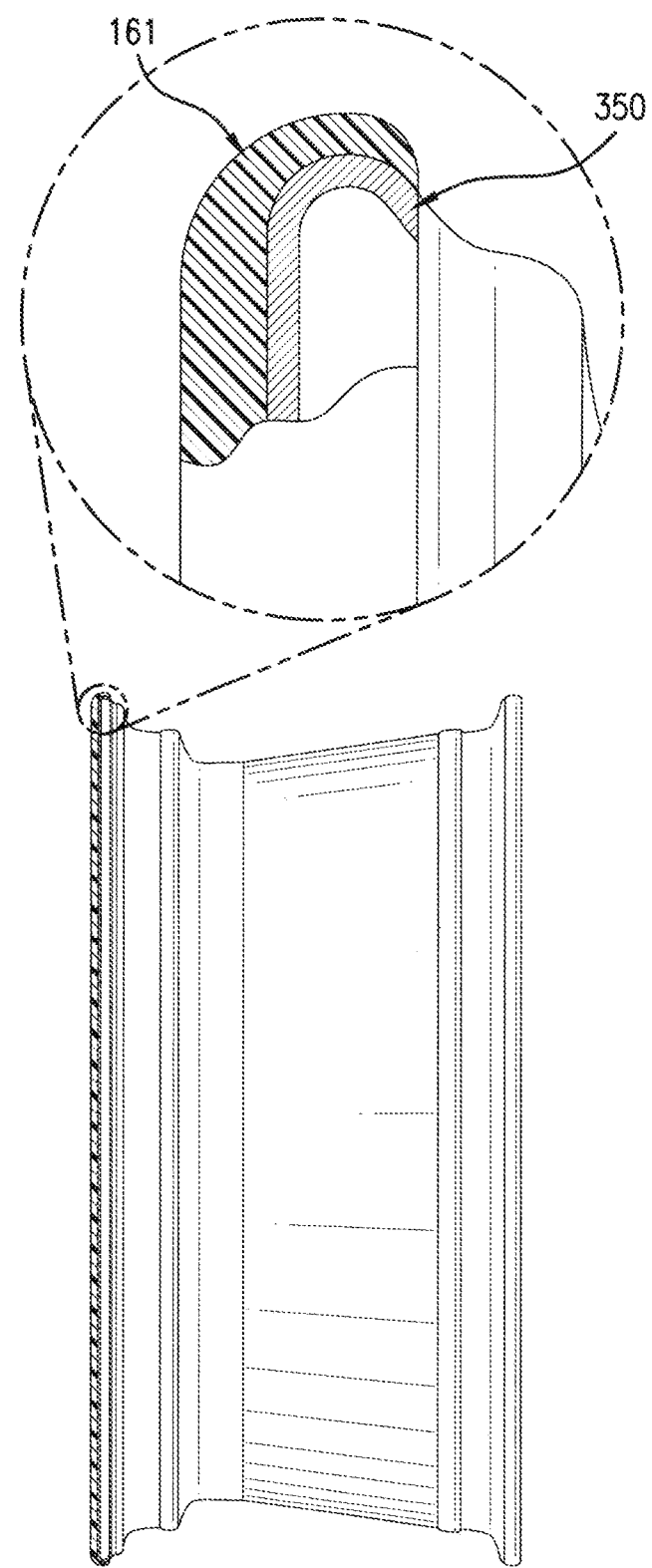
FIG. 12B illustrates a section diagram of FIG. 12A of the extended surround technology of the wheel cover overlay of the present invention.
Figure 12C:
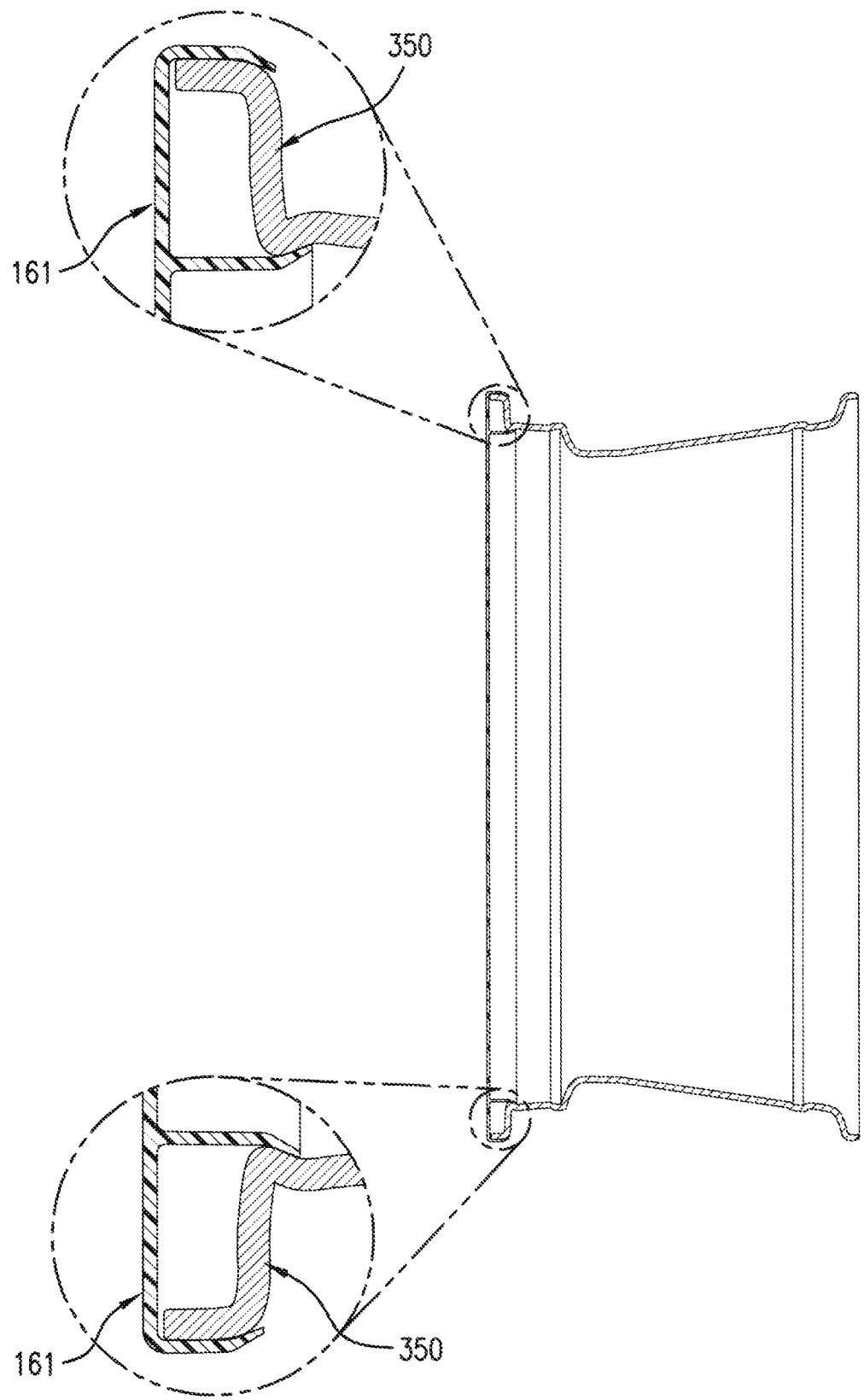
FIG. 12C illustrates an exploded side view of the extended surround technology of the wheel cover overlay of the present invention.

In contrast, FIG. 12A, FIG. 12B and FIG. 12C depict a wheel cover overlay with extended surround of the present invention 250, wherein upon mounted on an existing damaged manufacturer's wheel cover the peripheral boundary 160 combined with the peripheral extended surround 161 of the present invention covers the existing damaged manufacturer's wheel cover and the entire automobile rim upon which it is mounted.

A cross sectional area of FIG. 12A is represented in FIG. 12B, which depicts how the wheel cover overlay with extended surround of the present invention 250 covers the entire automobile rim when installed. Specifically referring to FIG. 123, the cross sectional area illustrates the peripheral extended surround 161 completely covering a manufacturer's automobile rim 350. The extended surround 161 of this present invention can be of any length; however, the present invention anticipates the maximum length of the extended surround 161 to be such length whereby, the wheel cover overlay of the present invention, when installed covers the entire automobile rim. That is, no space is left between the wheel cover overlay with extended surround of the present invention 250 and the rim 350 of an automobile when the former is snapped over the latter when covering an existing damaged manufacturer's wheel cover.

FIG. 12C is an exploded side angle view of FIG. 12A. Specifically, FIG. 12C, illustrates the peripheral extended surround 161 completely covering a manufacturer's automobile rim 350. Similarly to FIG. 12B, the extended surround 161 of this present invention can be of any length; however, the present invention anticipates the maximum length of the extended surround 161 to be such length whereby, the wheel cover overlay of the present invention, when installed covers the entire automobile rim. That is, no space is left between the wheel cover overlay with extended surround of the present invention 250 and the rim 350 of an automobile when the former is snapped over the latter when covering an existing damaged manufacturer's wheel cover.

Figure 13A:
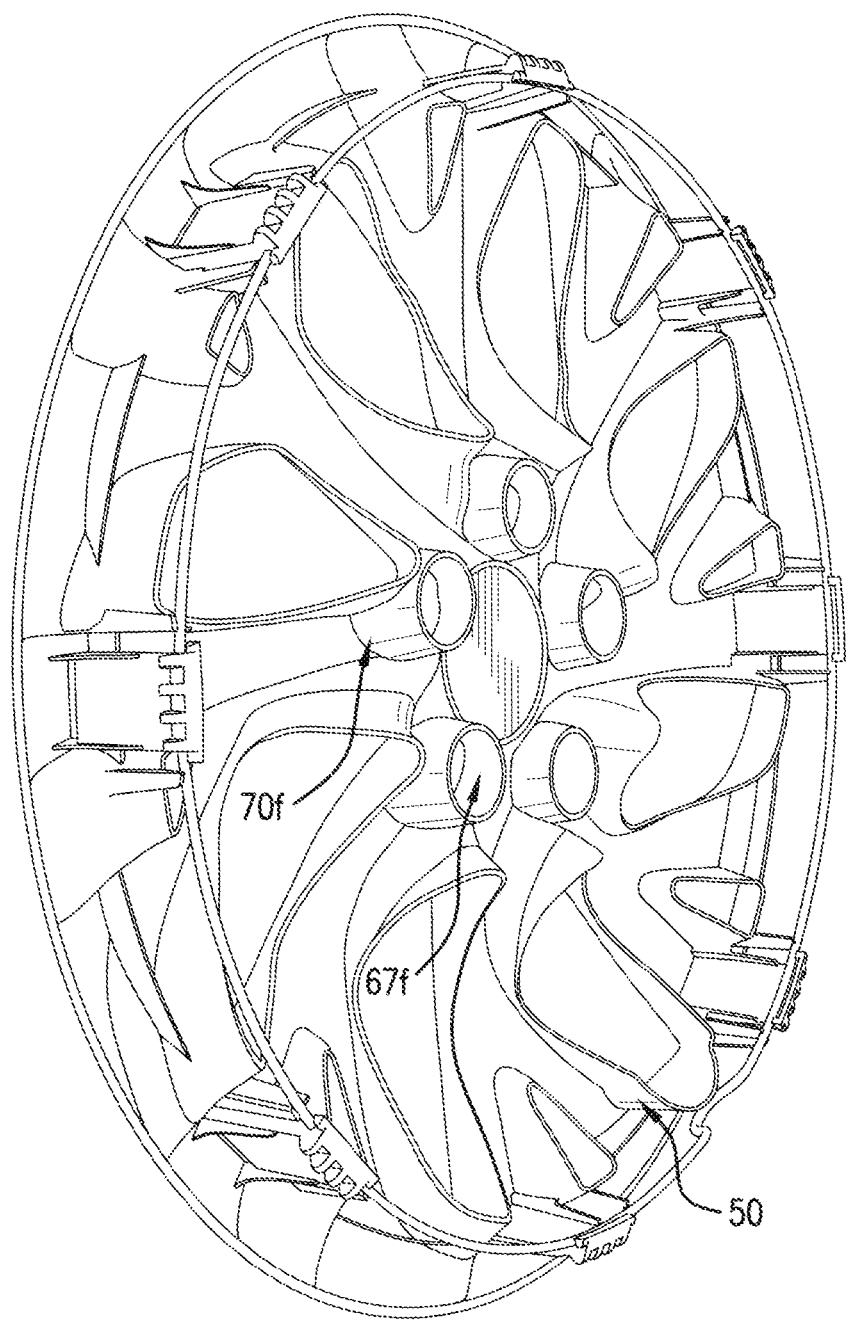
FIG. 13A illustrates a prior art's hub cap without hook-shaped members of the present invention.

Although the present invention is primarily geared towards a wheel cover overlay with extended surround, the hook-shaped members of the present invention are applicable to hub caps to ensured installation stability and installation security. FIG. 13A is a prior art hub cap comprising at least one major flange 50, at least one lug nut tower 70f and at least one lug nut tower through hole 67f.

Figure 13B:
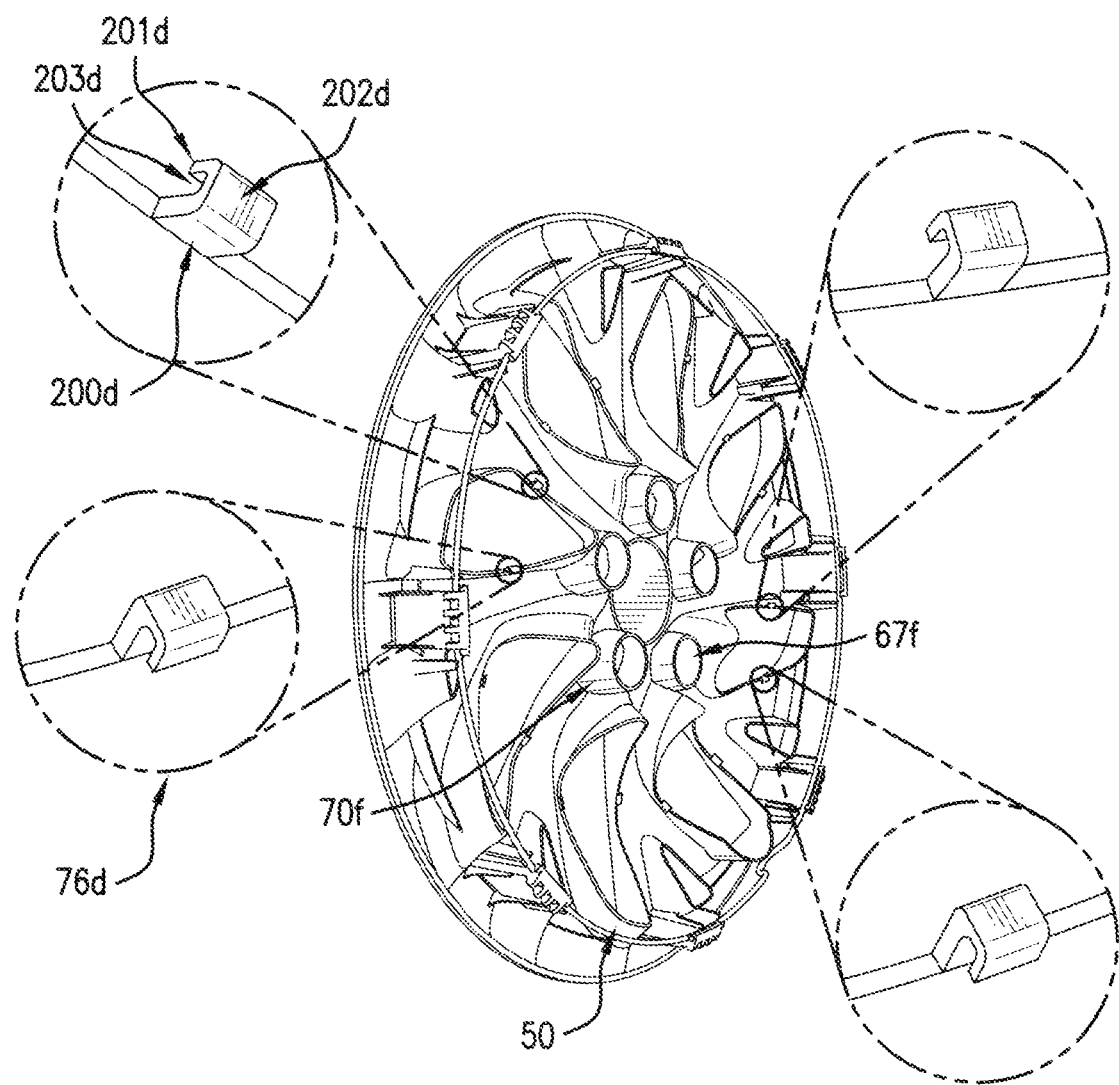
FIG. 13B illustrates a prior art's hub cap with hook-shaped members of the present invention on its flanges.

FIG. 13B depicts hook-shaped members of the present invention installed on flanges 50 of the prior art described in FIG. 13A. As shown in FIG. 13B are hook-shaped members represented as 76d of the present invention affixed along the circumference of the prior art's wheel cover major flanges 50 as depicted in FIG. 13A. Said hook-shaped members 76d are comprised of a rigid polymer longitudinal upper lip arm 200d connected to a rigid polymer longitudinal lower lip arm 201d, wherein said rigid polymer longitudinal upper lip arm and rigid polymer longitudinal lower lip arm are connected by a rigid polymer rightly curved or obtusely curved member 202d to form a continuous rigid polymer surface and a rigid polymer interior region 203d used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm. Said hook-shaped members 76d when manufactured on the prior art's hub cap flanges 50 are capable of having the same geometric shape as the affixed hook-shaped members described in 76b, 76c, 76d, 76e, 76f, 76g, 76h and 76i of the present invention.

Figure 13C:
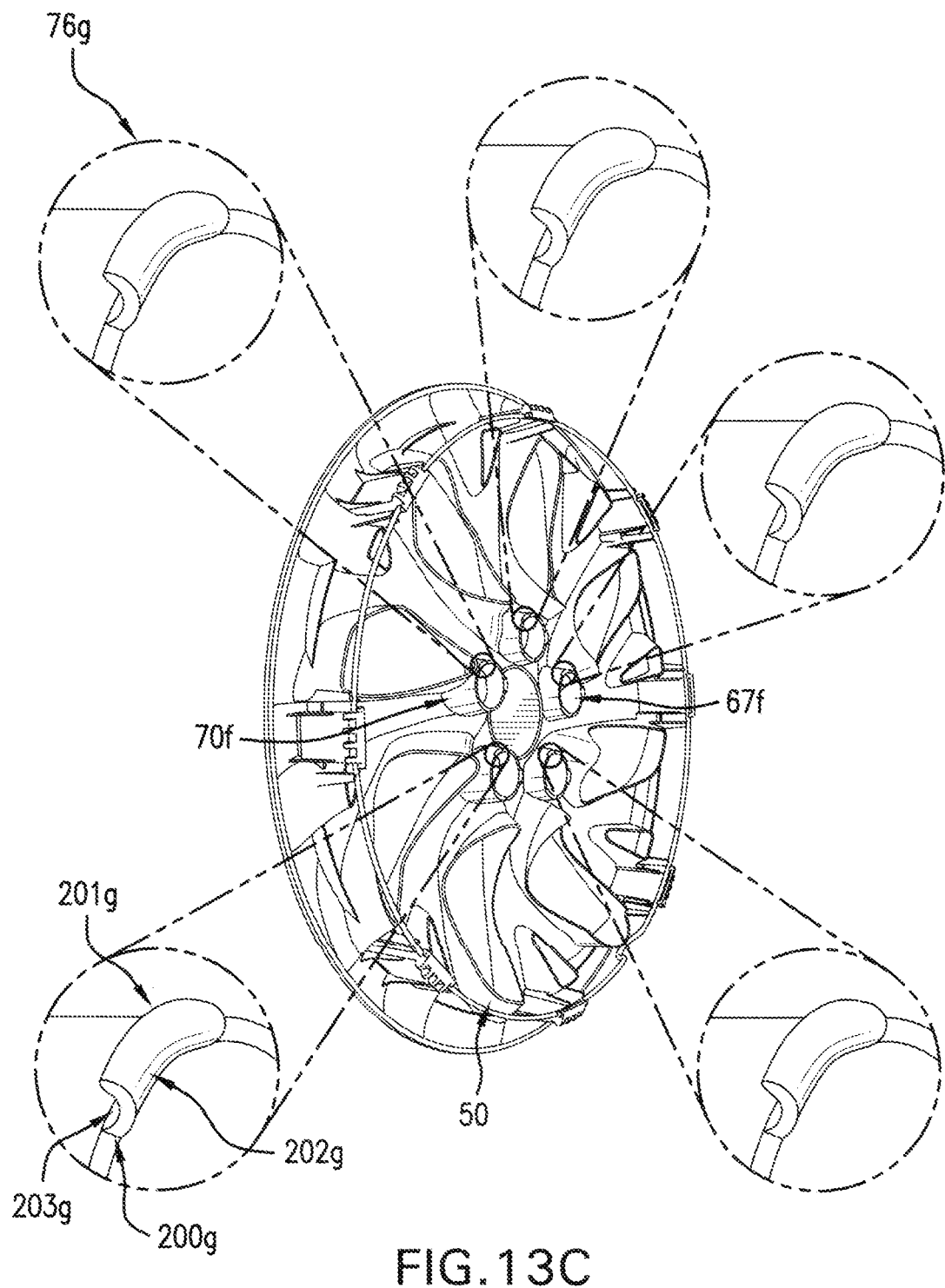
FIG. 13C illustrates a prior art's hub cap with hook-shaped members of the present invention on its lug nut towers.

Yet still, referring to an embodiment of this present invention, FIG. 13C depicts hook-shaped members of the present invention installed on lug nut towers 50 of the prior art described in FIG. 13A. Said hook-shaped members 76g affixed to said lug nut towers 70 are comprised of a rigid polymer longitudinal upper lip arm 200g connected to a rigid polymer longitudinal lower lip arm 201g, wherein said rigid polymer longitudinal upper lip arm and rigid polymer longitudinal lower lip arm are connected by a rigid polymer acutely curved and indented member 202g to form a continuous rigid polymer surface and a rigid polymer interior region 203g used for snapping on an automotive wheel cover overlay with complete surround of the present invention over an existing manufacturer's wheel cover. Said rigid polymer longitudinal lower lip arm is at most 50% of the length of said rigid polymer longitudinal upper lip arm. Said hook-shaped members 76g when manufactured on the prior art's hub cap lug nut towers 70 are capable of having the same geometric shape as the affixed hook-shaped members described in 76b, 76c, 76d,76e, 76f, 76g, 76h and 76i of the present invention.

Another key distinction between the prior art's wheel cover overlay, for example as depicted in FIG. 7A, and the present invention's wheel cover overlay with extended surround as depicted in FIGS. 8A through 10C is the width, height and alternating arrangements of the manufactured in place major tension tabs 90a and minor tension tabs 90b of the present invention as compared to the prior art. A final key distinction between the prior art's wheel cover overlay, for example as depicted in FIG. 7A, and the present invention's wheel cover overlay with extended surround as depicted in FIGS. 7B through 10C is the numerous geometric hook-shaped members configurations of the present invention as compared to the prior art.

That to produce the finished embodiment described in the specification, suitable polymer materials well known in the art are first selected and tested for strength, durability, malleability and resistance, etc. to meet after-market standards and particularly to meet the rigid original equipment manufacturer (OEM) standards demanded by established automobile manufacturers and distributors. Suitable rigid polymer materials are used without mixing or proportionally in percentile combination with other polymer materials, including but not limited to, polypropylene, polystyrene, polyethylene, polyvinyl chloride, and acrylonitrile butadeine styrene. Although rigid polymer materials are preferred, other possible non-polymer materials envisioned by the inventor are wood, metal, fiber glass, stainless steel, and carbon fabric, etc.

First, these materials (prior to being chrome plated and after being chrome plated) are placed through thermal cycle test(s) and exposed to predetermined temperature to examine for dimensional changes, deformation, clearance gaps, waviness, unevenness, creases, split, crack, breakage, blister, peeling and discoloration, etc. Second, these materials (prior to being chrome plated and after being chrome plated) are placed through chemical resistance test(s) and exposed to predetermined chemical concentrations, such as artificial perspiration, detergent, insect repellent, sun tan oil, sun screening cream and liquid paraffin, etc. to examine for dissolving, cloudiness, stains, discoloration, deformation, uneven surfaces, blooming, sticky surfaces, contamination, glossiness, cracking, breakage, softening, hardening, swelling, thinning and shrinkage, etc. Third, these materials (prior to being chrome plated and after being chrome plated) are placed under falling ball impact test(s) by dropping a steel ball from a predetermined height to examine for cracks, breakage, detrimental deformation on the materials visible surface, and for conforming, etc. Fourth, these materials (prior to being chrome plated and after being chrome plated) are placed through pencil scratch test(s) and exposed to predetermined variable models of pencils, so as to examine for surface hardness and scratch resistance, etc. Fifth, these materials (prior to being chrome plated and after being chrome plated) are placed through abrasion resistance test(s) or TABER and exposed to predetermined abrasion wheels, load and rotation speed, etc. so as to examine for glossiness before gloss, after gloss and overall gloss retention. Sixth, these materials (prior to being chrome plated and after being chrome plated) are placed through scratch resistance test(s) and exposed to predetermined load, scratching speed and scratch length using sand paper, glass bead and abrasion tester to examine for based surface exposure, flaw observation rank and the difference between gloss value after test and initial gloss value.

After the suitable materials are selected and tested as describe above, a three dimensional (3D) scanned imaging of the individual embodiment component parts are generated. Next, the three dimensional scanned imaging of said individual embodiment component parts are transferred to an injection molding computer to generate the injection molding designed precisely corresponding to each individual component parts of the embodiments of the present invention. Next, the desired material (preferably, but not limited to, rigid polymer material) is placed in the injection molding to form the individual component parts. After the individual component parts are formed from the injection molding, a fine tuning/finishing process ensues where the component parts are smoothed to remove all/any sharp and/or rough edges. Finally, the individual component parts of the present invention are chromed to obtain the final product.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter. The snap-on technology of this present invention with variation and unique contours can be used for other car accessories such as wheels, view mirrors, side mirrors, license plate covers, etc. These accessories are capable of being fitted with LEDs as deemed necessary and appropriate and consistent with various regulations.

Those skilled in the art will readily appreciate that various modifications and changes can be applied to the embodiment of the invention as herein before described without departing from its scope, defined in and by the appended claims.

What is claimed is:

1. An improved wheel cover overlay assembly with extended surround capable of being snapped on and over an existing manufacturer's or after market's automotive wheel cover and providing the appearance of a new or enhanced manufacturer's or after market's automotive wheel cover without the need of first removing said existing automotive wheel cover comprising:

an inboard surface area, an outboard surface area, a peripheral boundary, a peripheral extended surround, a plurality of lug nut towers wherein said plurality of lug nut towers comprising through holes, a plurality of major flanges with walls protruding from said inboard surface area, wherein said plurality of major flanges comprising a plurality of through holes directly carved into the surface of said inboard surface area, a plurality of minor flanges with walls protruding from said inboard surface area, said plurality of minor flanges comprising a plurality of through holes directly carved into the surface of said inboard surface area, a plurality of hook-shaped members on said major and minor flanges comprising a hook-shaped member portion comprising a rigid polymer lip protruding continuously and axially and connected to a rigid polymer longitudinal edge, which is continuously and radially connected to a rigid polymer curved arm edge of said hook-shaped member portion, and further comprising another hook-shaped member portion comprising a rigid polymer lip protruding continuously and axially and connected to a rigid polymer longitudinal edge which is continuously and radially connected to a rigid polymer curved arm edge on the opposite end, a tension tabs assembly comprising at least one minor tension tab and at least one major tension tab, said major tension tab comprising a rigid curved polymer lip protruding continuously along the entirety of a rigid polymer longitudinal edge, which is continuously connected to a rigid polymer curved arm edge on one end and a rigid polymer curved arm edge on the opposite end.

2. The improved wheel cover overlay assembly as in claim 1, further comprising a tension tab guide plate, a tension tab guide plate slit, a vehicle emblem support device, at least one tension tab of said vehicle emblem support device, a tension rotation device, a tension rotation device prong, a tension rotation device opening, and a tension device fastener.

3. The improved wheel cover overlay assembly as in claim 2, wherein said major tension tab is manufactured at an angle of up to fifteen (15) degrees measured from the position of said minor tension tab.

4. The improved wheel cover overlay assembly as in claim 3, wherein said peripheral extended surround extends to cover and entire vehicle rim.

5. The improved wheel cover overlay assembly as in claim 2, wherein said peripheral extended surround extends to cover and entire vehicle rim.

6. The improved wheel cover overlay assembly as in claim 1, wherein said peripheral extended surround extends to cover and entire vehicle rim.

7. An improved wheel cover overlay assembly with extended surround capable of being snapped on and over an existing manufacturer's or after market's automotive wheel cover and providing the appearance of a new or enhanced manufacturer's or after market's automotive wheel cover without the need of first removing said existing automotive wheel cover comprising:

an inboard surface area, an outboard surface area, a peripheral boundary, a peripheral extended surround, a plurality of lug nut towers wherein said plurality of lug nut towers comprising through holes, a plurality of major flanges with walls protruding from said inboard surface area, wherein said plurality of major flanges comprising a plurality of through holes directly carved into the surface of said inboard surface area, a plurality of minor flanges with walls protruding from said inboard surface area, said plurality of minor flanges comprising a plurality of through holes directly carved into the surface of said inboard surface area, a plurality of hook-shaped members on said major and minor flanges comprising a hook-shaped member portion comprising a rigid polymer lip protruding continuously and axially and connected to a rigid polymer longitudinal edge, which is continuously and radially connected to a rigid polymer curved arm edge of said hook-shaped member portion, and further comprising another hook-shaped member portion comprising a rigid polymer lip protruding continuously and axially and connected to a rigid polymer longitudinal edge which is continuously and radially connected to a rigid polymer curved arm edge on the opposite end, a tension tab guide plate, a tension tab guide plate slit, a vehicle emblem support device, at least one tension tab of said vehicle emblem support device, a tension rotation device, a tension rotation device prong, a tension rotation device opening, a tension device fastener, a tension tabs assembly comprising at least one minor tension tab and at least one major tension tab, said major tension tab comprising a rigid curved polymer lip protruding continuously along the entirety of a rigid polymer longitudinal edge, which is continuously connected to a rigid polymer curved arm edge on one end and a rigid polymer curved arm edge on the opposite end, and said improved wheel cover overlay assembly with extended surround is manufactured by process comprising the steps of:

i. selecting suitable polymer materials;
ii. performing thermal cycle testing of said suitable polymer materials;
iii. performing chemical resisting testing of said suitable polymer materials;
iv. performing falling ball impact testing of said suitable polymer materials;
v. performing pencil scratching testing of said suitable polymer materials;
vi. performing abrasion resistance testing of said suitable polymer materials;
vii. performing scratch resistance testing of said suitable polymer materials;
viii. providing a three dimensional scanned imaging of individual component parts;
ix. transferring said three dimensional scanned imaging of said individual component parts to an injection molding computer to generate precise corresponding design of said component parts;
x. placing rigid polymer material in an injection molding to form said individual component parts;
xi. finishing said component parts by smoothing said parts and removing all sharp and rough edges; and
xii. chroming said component parts.

8. The improved wheel cover overlay assembly as in claim 7, wherein said major tension tab is manufactured at an angle of up to fifteen (15) degrees measured from the position of said minor tension tab.

9. The improved wheel cover overlay assembly as in claim 8, wherein said peripheral extended surround extends to cover an entire vehicle's rim.

* * * * *